United States Patent
Park et al.

(10) Patent No.: US 11,660,715 B2
(45) Date of Patent: May 30, 2023

(54) AUTOMATIC ATTACHMENT CHANGER AND BORING MACHINE HAVING SAME

(71) Applicant: DN Solutions Co., Ltd., Changwon-si (KR)

(72) Inventors: Jongyoung Park, Changwon-si (KR); Bounghak Cho, Changwon-si (KR)

(73) Assignee: DN SOLUTIONS CO., LTD., Changwon-si (KR)

(*) Notice: Subject to any disclaimer, the term of this patent is extended or adjusted under 35 U.S.C. 154(b) by 837 days.

(21) Appl. No.: 16/620,522

(22) PCT Filed: Jun. 8, 2018

(86) PCT No.: PCT/KR2018/006513
§ 371 (c)(1),
(2) Date: Aug. 13, 2020

(87) PCT Pub. No.: WO2018/226061
PCT Pub. Date: Dec. 13, 2018

(65) Prior Publication Data
US 2021/0046598 A1 Feb. 18, 2021

(30) Foreign Application Priority Data
Jun. 8, 2017 (KR) .................. 10-2017-0071373

(51) Int. Cl.
*B23Q 3/157* (2006.01)
*B23Q 17/00* (2006.01)
*B23Q 3/155* (2006.01)

(52) U.S. Cl.
CPC ..... *B23Q 3/15526* (2013.01); *B23Q 3/15536* (2016.11); *B23Q 3/15713* (2013.01);
(Continued)

(58) Field of Classification Search
CPC ............ B23Q 3/15526; B23Q 3/15536; B23Q 3/15539; B23Q 17/006;
(Continued)

(56) References Cited

U.S. PATENT DOCUMENTS 4,943,199 A * 7/1990 Hillen ................ B23Q 3/15536
414/280
5,860,900 A * 1/1999 Dunning ................ B23Q 17/00
414/730

(Continued)

FOREIGN PATENT DOCUMENTS

CN 202742044 U 2/2013
CN 202742116 U 2/2013
(Continued)

OTHER PUBLICATIONS

Machine Translation of CN202742044U—Yin et al., "Large-calibre Heat Stewing Elbow Groove Machining Dedicated Workbench", Feb. 20 (Year: 2013).*

(Continued)

*Primary Examiner* — Erica E Cadugan
*Assistant Examiner* — Michael Vitale
(74) *Attorney, Agent, or Firm* — STIP Law Group, LLC

(57) ABSTRACT

Disclosed are an automatic attachment changer and a boring machine having the same. The automatic attachment changer includes a stacker in which a plurality of attachments is stacked in a height direction by a unit of housing cell having a length larger than the attachments such that the attachment is individually arranged in each housing cell horizontally with respect to a bottom of the stacker, a stacker carrier having a carrier body secured to the stacker, a body transfer transferring the carrier body and a carrier power driving the body transfer, and an attachment changer controlling the stacker and the stacker carrier such that a select attachment is selected among the attachments and the select attachment is combined to a spindle assembly. The attachment is changed in the boring machine with high reliability and correctness.

17 Claims, 18 Drawing Sheets

(52) U.S. Cl.
CPC .. *B23Q 17/006* (2013.01); *B23Q 2003/15537* (2016.11); *B23Q 2717/00* (2013.01); *Y10T 483/13* (2015.01); *Y10T 483/1809* (2015.01)

(58) Field of Classification Search
CPC ........... B23Q 2003/15527; B23Q 2003/15537; Y10T 483/13; Y10T 483/136; Y10T 483/18; Y10T 483/1809; Y10T 483/1845; Y10T 483/1855
USPC .............................. 483/7, 10, 58, 59, 63, 64
See application file for complete search history.

(56) References Cited

U.S. PATENT DOCUMENTS

| | | | | |
|---|---|---|---|---|
| 2013/0085049 A1* | 4/2013 | Zeng | ................. | B23Q 3/15526 483/66 |
| 2022/0161379 A1* | 5/2022 | Zoller | ..................... | B25H 3/00 |

FOREIGN PATENT DOCUMENTS

| | | | |
|---|---|---|---|
| CN | 204339401 U | | 5/2015 |
| DE | 3707318 A1 | * | 9/1988 |
| DE | 4116487 A1 | * | 11/1992 |
| EP | 0483781 A2 | * | 5/1992 |
| JP | 58051047 A | * | 3/1983 |
| JP | 62136351 A | * | 6/1987 |
| JP | H08309636 A | | 11/1996 |
| JP | 2001198762 A | | 7/2001 |
| KR | 1020160044939 A | | 4/2016 |
| KR | 1020160070479 A | | 6/2016 |
| KR | 1020170054885 A | | 5/2017 |

OTHER PUBLICATIONS

International Search Report of PCT/KR2018/006513, dated Sep. 10, 2018, English translation.

* cited by examiner

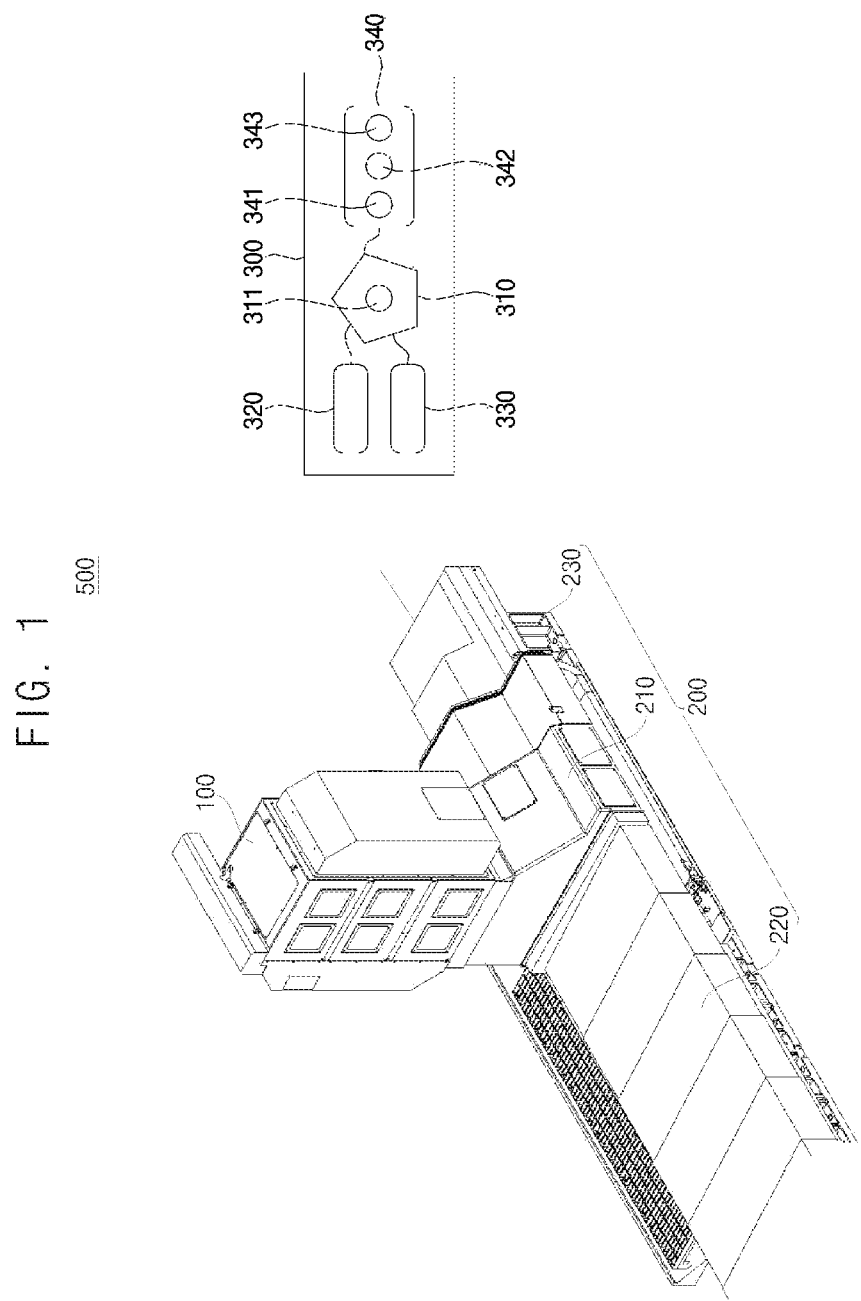

FIG. 6B

ATTACHMENT SETTING FUNCTION

RACK1 SET

| NO. | CONTENTS | SET VALUE | RANGE |
|---|---|---|---|
| 1 | ATTACHMENT MODEL NO. | | CHARACTER |
| 2 | ATTACHMENT NO. | 99 | 1~99 |
| 3 | RACK NO. | 99 | 1~99 |
| 4 | USE COUPLING | 0 | 0/1 |
| 5 | ATTACHMENNT LENGTH | 1 | 0~99999 |
| 6 | SPINDLE MAX SPEED | 800 | 0~99999 |
| 7 | U/W-AXIS MAX RAPID | 6000000 | 0~99999999 |
| 8 | U/W-AXIS MAX CUTTING | 4000000 | 0~99999999 |
| 9 | RESERVED | 0 | 0~99999999 |
| 10 | SPINDLE ORIENTATION SHIFT POSITION | 1553 | -4095~4095 |
| 11 | U/W-AXIS + STROKE | 1000 | SIGNED INT |
| 12 | U/W-AXIS - STROKE | -701000 | SIGNED INT |
| 13 | U/W-AXIS GEAR RATIO | 0 | 0~99999999 |

EDIT **** --EMG-- ALM 13:44:03

<< | ATT SET | ATT POS

FIG. 7

| NO. | CONTENTS | SET VALUE | RANGE |
|---|---|---|---|
| 1 | ATTACHMENT CHANGE POSITION X-AXIS | 0 | SIGNED INTERGER |
| 2 | ATTACHMENT CHANGE POSITION Y-AXIS | 388288 | SIGNED INTERGER |
| 3 | ATTACHMENT CHANGE POSITION Z-AXIS | 13750 | SIGNED INTERGER |
| 4 | ATTACHMENT CHANGE POSITION W-AXIS | 0 | SIGNED INTERGER |
| 5 | ATTACHMENT CHANGE POSITION B-AXIS | 0 | SIGNED INTERGER |
| 6 | ATTACHMENT CHANGE POSITION V-AXIS | 40070 | SIGNED INTERGER |
| 7 | RESERVED 1 | 0 | SIGNED INTERGER |
| 8 | RESERVED 2 | 0 | SIGNED INTERGER |
| 9 | RESERVED 3 | 0 | SIGNED INTERGER |
| 10 | RESERVED 4 | 0 | SIGNED INTERGER |
| 11 | RESERVED 5 | 0 | SIGNED INTERGER |

ATTACHMENT SETTING FUNCTION
RACK1 SET

MACHINE POS.
X 1006.299   W -497.852
Y 2499.999   B  359.999
Z 1999.996   V 3999.994

EDIT **** --EMG-- ALM 13:44:03

<< | ATT SET | ATT POS

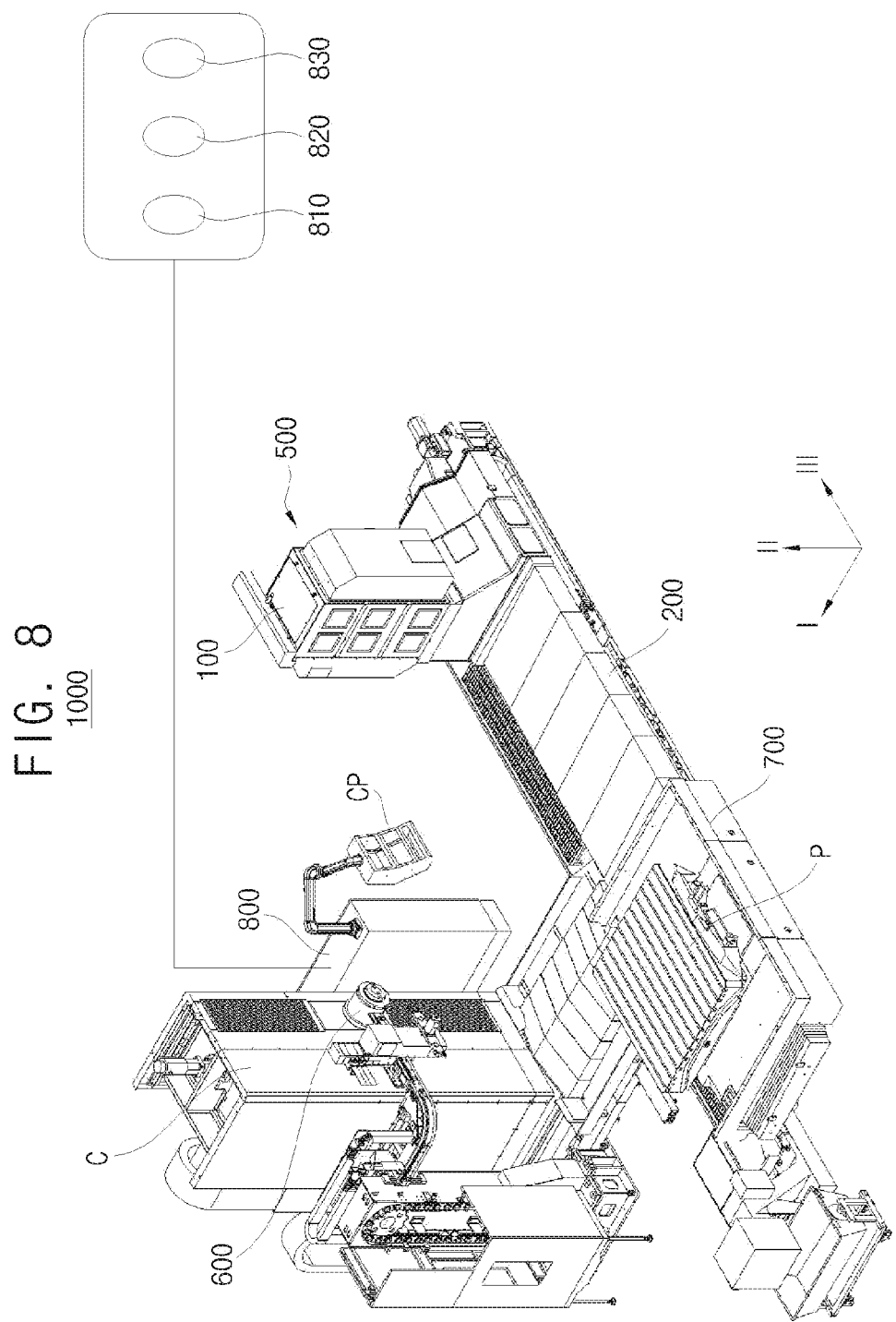

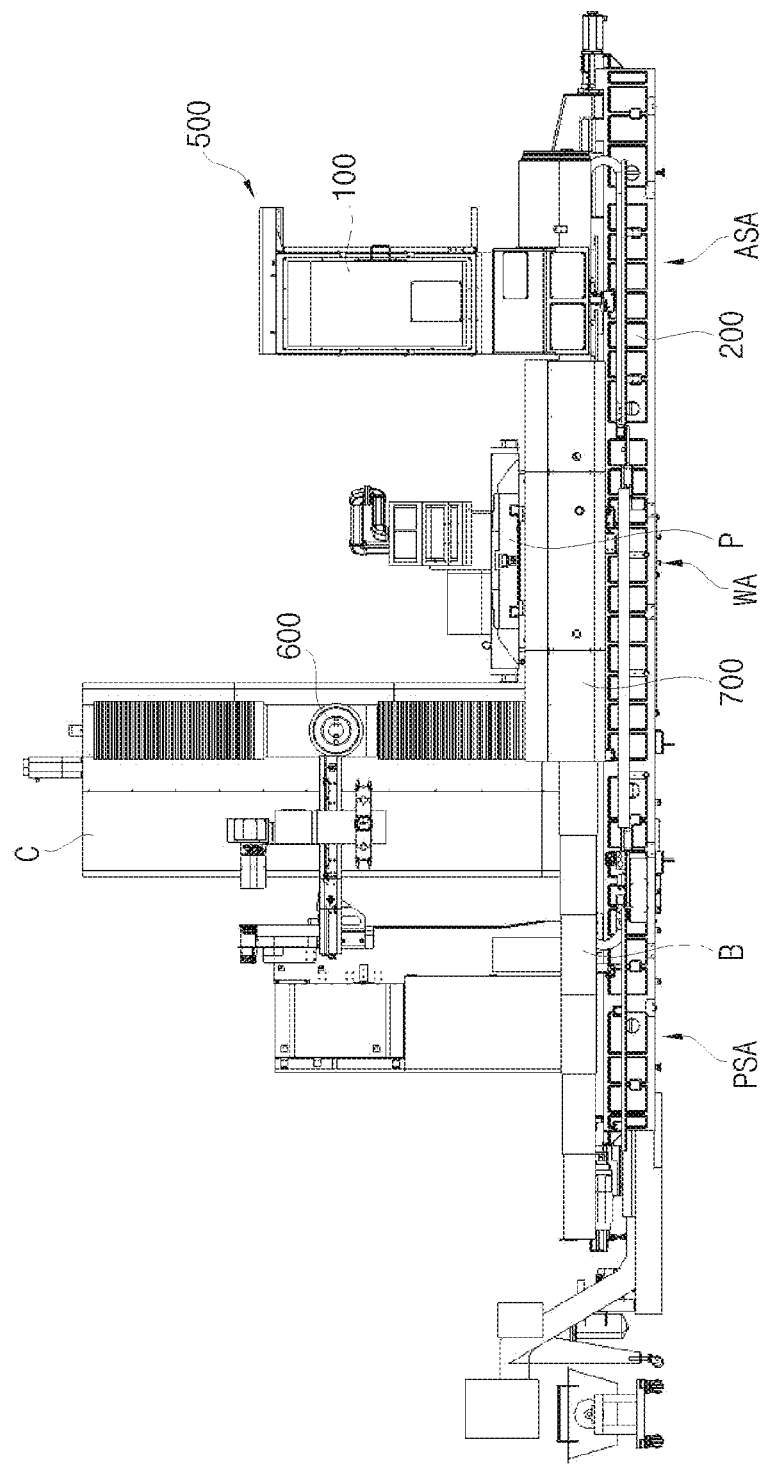

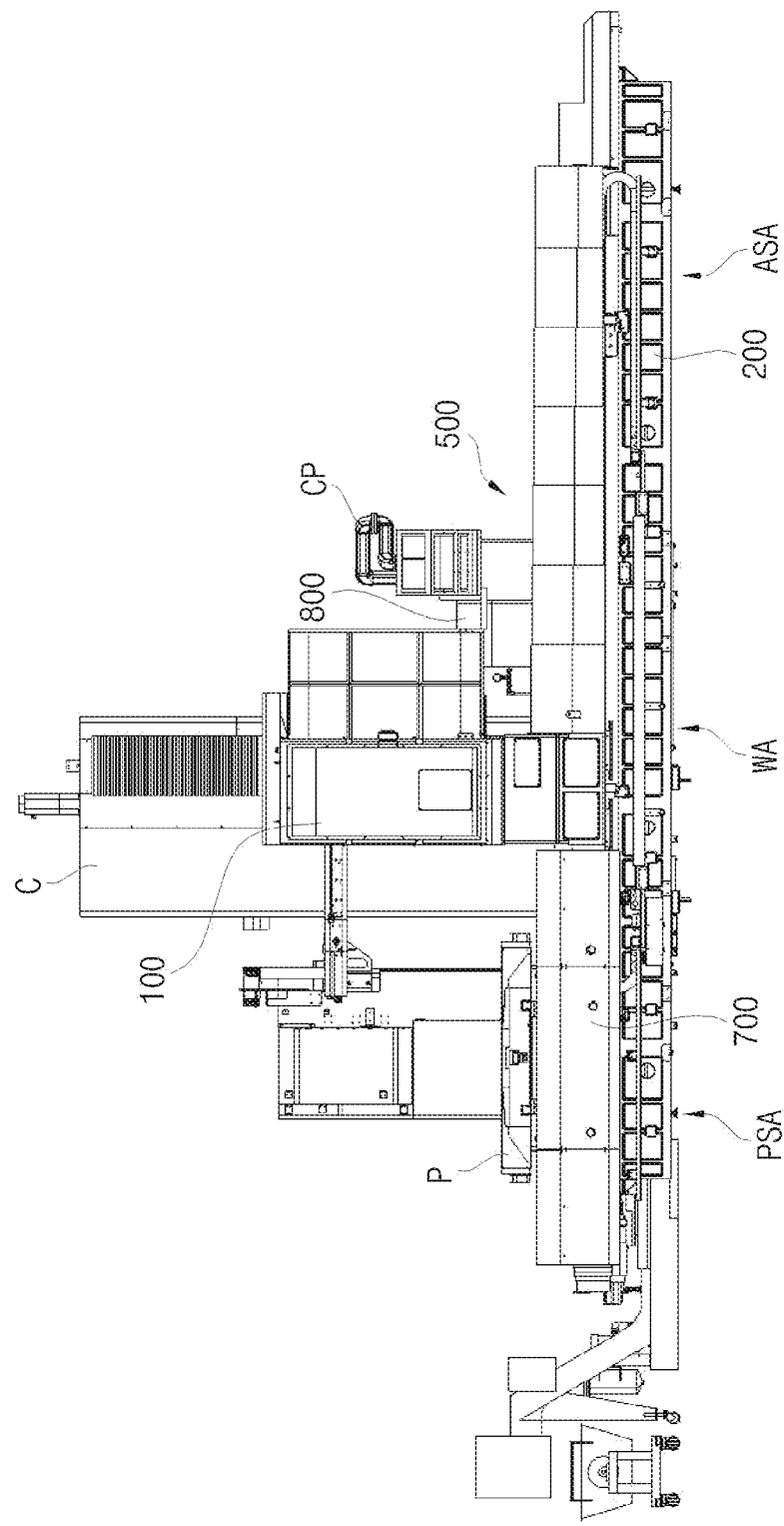

AUTOMATIC ATTACHMENT CHANGER AND BORING MACHINE HAVING SAME

CROSS-REFERENCE TO RELATED APPLICATIONS

This application is the U.S. National Phase under 35 U.S.C. § 371 of International Application No. PCT/KR2018/006513 filed on Jun. 8, 2018, which is based upon and claims the benefit of priority to Korean Patent Application No. 10-2017-0071373, filed on Jun. 8, 2017 in the Korean Intellectual Property Office. The disclosures of the above-listed applications are hereby incorporated by reference herein in their entirety.

BACKGROUND

1. Field

The present inventive concepts relate to an automatic attachment changer and a boring machine including the same, and more particularly, to an automatic attachment changer for automatically picking up a selected attachment from a stacker and automatically changing a working attachment with the selected attachment and a horizontal boring machine including the same.

2. Description of the Related Art

A boring machine has been widely used for forming or widening a hole to a workpiece. Recently, the workpiece has been magnified and complicated and the required hole configurations have been very much complicated while a large number of the holes are required in a single workpiece. For those reasons, recent boring processes have been automatically controlled under numerical control algorithms and the conventional boring machines tend to progress into a numerical control (NC) boring machine.

Conventional boring machine usually needs some particular boring tools and boring attachments that can be specialized to the boring process in the boring machine, and any other boring tools and boring attachments irrelevant to the corresponding boring machine are not adopted. That is, the boring machine and the boring attachments usually classified and grouped according to the boring process and the characteristics of the boring machine. Thus, the automatic control to the boring tools and the boring attachments is not usually required in the conventional boring machine. However, recent boring machine requires much more automation than ever before due to the high boring accuracy and size increase of the workpiece. Particularly, the high boring accuracy of the boring process necessarily requires various boring tools and boring attachments in a single boring machine, so that various numerical control technologies are applied to the recent boring machine and various attachment changes are conducted in the recent boring machine.

The boring machines usually adopt a particular group of tools and attachments that are to be optimized for a particular boring process in the concerned boring machine, and the number of the tools and the attachments for the boring machine is so small that the numerical control is not necessarily required for the conventional boring machine. However, the number of the tools and attachments for the recent boring machine tends to increase due to the high boring accuracy, and as a result, the recent boring machine tends to be automated more and more by using the numerical control technologies.

For example, a 5-axis process has been widely used for an accurate boring process to a magnificent workpiece. The 5-axis boring machine conducts the boring process at different 5 faces of the workpiece and requires different attachments each of which is infallible to the boring process to each face. Thus, the attachment change and the tool change are necessarily needed whenever the boring process is changed at the same face and whenever the process face of the workpiece is changed. Accordingly, a large number of attachment changes are necessarily conducted in the recent boring machines.

In the conventional boring processes, most of the attachment change is manually conducted by an operator of the boring machine, while the tool change is automatically conducted by an automatic tool changer (ATC). For example, the horizontal boring machine, which is optimized for a boring process to the magnificent workpiece, is usually provided together with the ATC in one body. However, the automatic attachment changer (AAC) is not provided with the horizontal boring machine in view of the maintenance cost and the installation area. Thus, the attachment change is usually conducted by the operator of the horizontal boring machine.

For that reason, when the attachment change is required in the conventional horizontal boring process, a proper attachment is selected as a select attachment among a plurality of attachments in the attachment storing house and the select attachment is transferred to the operator from the attachment storing house by a transfer crane. Then, a work attachment is manually separated from a spindle of the boring machine and the select attachment is manually combined to the spindle by the operator. Thereafter, new attachment specifications of the select attachment are manually added the attachment data of the numerical controller and the actual position of an attachment adapter is newly set as an origin point of the reference coordinate system in the horizontal boring machine.

However, the manual exchange of the attachment and the manual data correction of the numerical controller significantly reduce the efficiency and accuracy of the boring process, especially the boring process to the magnificent workpiece. Particularly, the attachment selection among the various attachments and the crane transfer of the select attachment remarkably reduces the efficiency of the attachment change, and the input error of the attachment data to the numerical controller and the origin mistake of the reference coordinate system necessarily causes the fatal boring defects such as tool breaks and boring position errors at the workpiece.

Accordingly, there has been needed a new horizontal boring machine in which the attachment change is automatically conducted under the numerical controller.

SUMMARY

Example embodiments of the present inventive concept provide an automatic attachment changer for automatically changing a select attachment in a direction horizontally with respect to a bottom of a stacker in which the select attachment is arranged.

Other example embodiments of the present inventive concept provide a boring machine having the above automatic attachment changer.

According to some example embodiments of the present inventive concepts, there is provided an automatic attachment changer including a stacker in which a plurality of attachments may be stacked in a height direction by a unit of housing cell having a length larger than the attachments in such a configuration that at least one of the attachments may be individually arranged in each housing cell horizontally with respect to a bottom of the stacker, a stacker carrier having a carrier body secured to the stacker, a body transfer transferring the carrier body and a carrier power driving the body transfer, and an attachment changer controlling the stacker and the stacker carrier such that a select attachment may be selected among the attachments and the select attachment is combined to a spindle assembly.

According to some example embodiments of the present inventive concept, there is provided a boring machine including a spindle assembly secured to a column structure that may move in a first direction and extend in a second direction substantially perpendicular to the first direction and selectively combined with at least one of a tool and a select attachment, a table to which a workpiece may be secured and moving in a third direction substantially perpendicular to the first direction and the second direction, and an automatic attachment changer having a stacker in which a plurality of attachments may be arranged horizontally with respect to the table and connected to the table in a line movably in the third direction, in such a case, the automatic attachment changer may control the stacker to be aligned with the spindle assembly and automatically conduct an attachment changer with the select attachment in response to an attachment change signal.

According to example embodiments of the present inventive concepts, the change position at which the attachment change may occur may be automatically or semi-automatically determined and the stacker including the select attachment may move to the change position in response to the attachment change signal. Then, the select attachment may be automatically combined to the spindle assembly of the boring machine. The attachment data of the select attachment may be automatically called up from the data storage unit and the current attachment data may be automatically modified based on the attachment data of the select attachment. The change position may be automatically detected based on the modified current attachment data.

Further, when the tool change and the attachment change may be automatically conducted according to the process step of the boring process under the control of the numerical controller, the transfer of the stacker and the retreat of the rotation axis to the design origin point and the coupling of the select attachment to the spindle structure and the modification of the current attachment data based on the attachment data of the select attachment may be automatically conducted in the attachment change process, thereby increasing the accuracy and efficiency of the attachment change. In addition, the retreat of the rotation axis 612 to the design origin point, the modification of the current attachment data based on the attachment data of the select attachment and the modification of the working origin point in the working area based on the attachment data of the select attachment may be automatically conducted in the attachment change process, thereby increasing the change accuracy of the attachment.

BRIEF DESCRIPTION OF THE DRAWINGS

Example embodiments will be more clearly understood from the following detailed description taken in conjunction with the accompanying drawings which represent non-limiting, example embodiments as described herein.

FIG. 1 is a perspective view illustrating an automatic attachment changer in accordance with an example embodiment of the present inventive concept;

FIGS. 6A and 6B are views illustrating a data structure by which the attachment data may be stored in the data storage unit in accordance with an example embodiment of the present inventive concept;

FIG. 7 is a view illustrating a change position setting menu from the attachment data shown in FIG. 6B;

FIG. 8 is a perspective view illustrating a boring machine including the automatic attachment change shown in FIG. 1 in accordance with an example embodiment of the present inventive concept;

FIG. 10A, FIG. 10B, FIG. 10C and FIG. 10D are cross sectional views illustrating processing steps for a method of automatically changing attachments in the boring machine shown in FIG. 8;

DESCRIPTION OF EMBODIMENTS

Figure 2A:
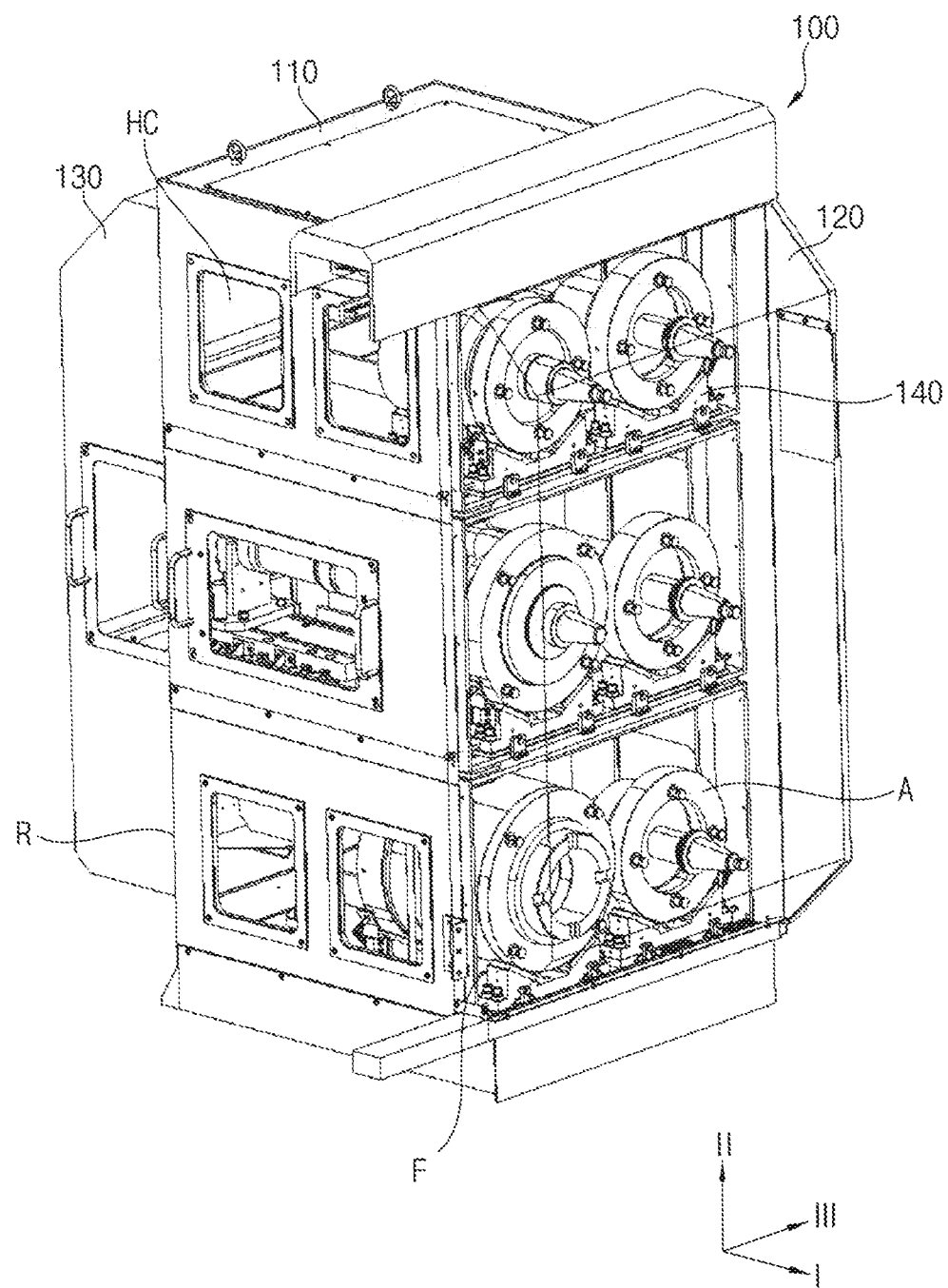
FIG. 2A is a perspective view illustrating the stacker of the AAC shown in FIG. 1.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, and/or sections, these elements, components, regions, and/or sections should not be limited by these terms. These terms are only used to distinguish one element, component, region, and/or section from another element, component, region, and/or section. For example, a first element, component, region, and/or section could be termed a second element, component, region, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a perspective view illustrating an automatic attachment changer in accordance with an example embodiment of the present inventive concept.

Referring to FIG. 1, an automatic attachment changer (AAC) 500 in accordance with an example embodiment of the present inventive concept may include a stacker 100 having at least a housing cell HC in which at least an attachment A may be individually received horizontally with respect to a bottom thereof, a stacker carrier 200 transferring the stacker 100 and a attachment changer 300 driving the stacker 100 and the stacker carrier 200.

In the present example embodiment, the attachment may be provided for combining with a boring tool and the AAC 500 may be provided as a part of a horizontal boring machine. In the present example embodiment, the attachment may be arranged horizontally with respect to a bottom of the stacker 100 and to a top surface of the table of the boring machine and the automatic attachment change may also be conducted horizontally with respect to the table of the boring machine. However, the AAC 500 may also be provided as a part of any other machining centers as long as the attachment is changed horizontally with respect to a table to which a workpiece is secured.

For example embodiments, the stacker 100 may include a plurality of housing cells HC therein. Each of the housing cells HC may have a length larger than that of the attachment A and the housing cells HC may be stacked in a height direction of the stacker 100. The attachment A may be individually received in each housing cell HC. In the present example embodiment, a pair of the housing cells HC may be arranged in a single floor and 3 floors of the housing cells HC may be provided in the stacker 100. However, the configurations and the arrangements of the housing cell HC may be varied in accordance with the machining center to which the AAC 500 may be combined. For example, the AAC 500 would include a single housing cell HC in the stacker 100.

Figure 2B:
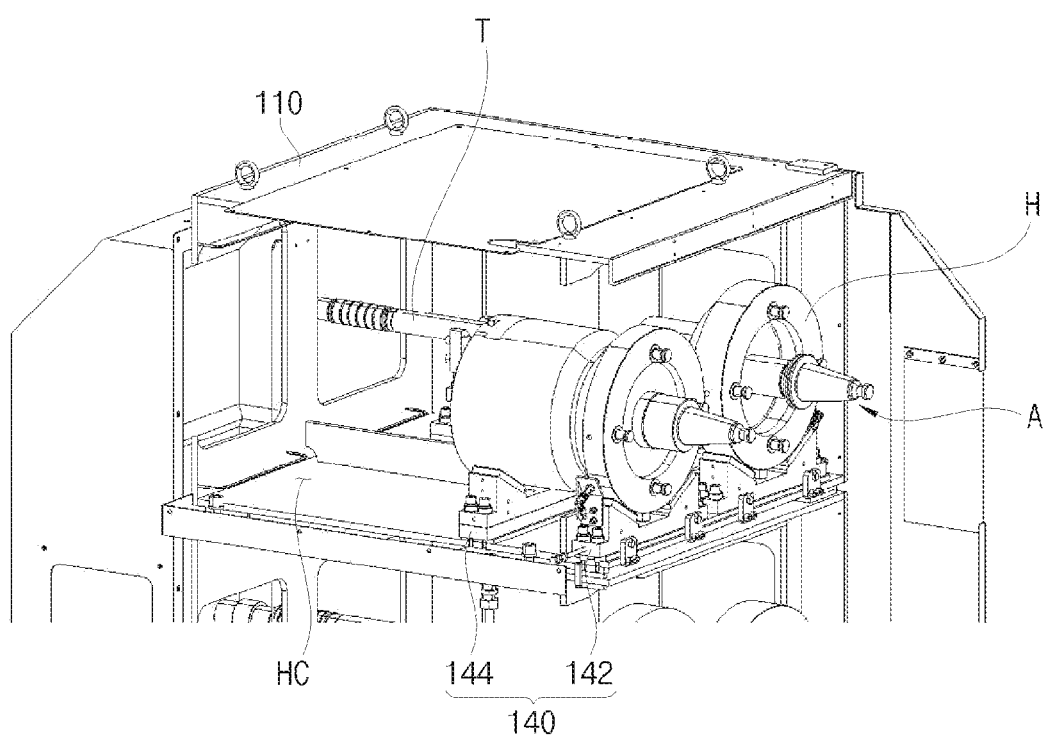
FIG. 2B is a partially enlarged perspective view illustrating the housing cell and the attachment received in the housing cell of the stacker shown in FIG. 2A.

FIG. 2A is a perspective view illustrating the stacker of the AAC shown in FIG. 1, and FIG. 2B is a partially enlarged perspective view illustrating the housing cell and the attachment received in the housing cell of the stacker shown in FIG. 2A.

Referring to FIGS. 2A and 2B, the stacker 100 may include a cubic body 110 in which the housing cells HC may be arranged, a door 120 covering a front portion F of the body 110 and a rear wall 130 covering a rear portion R of the body 110.

The door 120 and the rear wall 130 may prevent the surrounding contaminants around the body 110 from supplying into the housing cell HC, so the attachment A may be sufficiently protected from the surrounding contaminants. Particularly, the door 120 may be opened when the attachment change may occur and be closed when the attachment change may not be needed. Particularly, when the stacker 100 may move from a standby area to a change area at which the attachment change may occur, the door 120 may be closed and the attachment A in the stacker 100 may be sufficiently protected from surroundings when the stacker 100 may move. In such a case, the housing cell HC may be maintained under a predetermined cleanliness.

The body 110 of the stacker 100 may be shaped into a rectangular having a length in a first direction I, a height in a second direction II and a width in a third direction III and the body 110 may be divided into a plurality of the housing cells HC in such a way that each housing cell may have a cell length substantially the same as the length of the body 110 in the first direction I. Thus, the housing cell HC may have an inlet at the front portion F of the body 110 and may extend in the first direction I. A plurality of the housing cells HC may be stacked in the body 110 in the second direction II and may be arranged in parallel with each other in the third direction III. Thus, the housing cell HC may have a cell height and a cell width smaller than the height and the width of the body 110. A review window (not shown) may be arranged at a side surface of the housing cell HC, so an operator of the AAC 500 may watch the inside of each housing cell HC. A number of the housing cells HC may be v varied by a size of the housing cells HC in the body 110.

The attachment A may include a head portion H combined to a spindle assembly of the horizontal boring machine and a tail portion T extending from the head portion H and inserted into the housing cell HC. Particularly, the housing cell HC may be provided in such a configuration that the cell length may be larger than a length of the tail portion T, and thus the attachment A may be sufficiently received in the housing cell HC regardless of the length of the tail portion T. In the present example embodiment, a pair of the housing cells HC may be provided in parallel with each other on the same floor of the body 110 and a 3-floor of the housing cells HC may be arranged in the body 110. Thus, 6 attachments may be maximally stored in the stacker 100 regardless of the length of the tail portion T.

The attachment A may be arranged in the housing cell HC in such a configuration that the head portion H may be positioned at the inlet and the tail portion T may extend from the head portion H into the inside of the housing cell HC horizontally with respect to a bottom of the body 110. Thus, the tail portion T may be positioned around the rear portion R horizontally with respect to the bottom of the body 110 and the head portion H may be positioned around the front portion F horizontally with respect to the bottom of the body 110. That is, the attachment A may be received in the housing cell HC horizontally with respect to the bottom of the body 110.

In the conventional attachment magazine, the attachments are arranged in a magazine vertically with respect to a bottom of the magazine and the magazine is spaced apart from the boring machine. Thus, the attachment is firstly selected and extracted from the magazine and the selected attachment itself is transferred to a change area of the horizontal boring machine. Thereafter, the selected attachment is combined to the spindle assembly of the boring machine. However, in the present example embodiment of the AAC 500, each of the attachments A may be arranged horizontally with respect to the bottom of the body 110 in the stacker 100, and the stacker 100 itself (in place of the conventional selected attachment) may be transferred to the change area of the boring machine. Then, a particular attachment may be selected among a plurality of the attachments A in the stacker 100 as a select attachment and the select attachment may be directly combined to the spindle assembly of the boring machine from the stacker 100 without any individual attachment transfer. Accordingly, the automatic attachment change may be conducted with a sufficient accuracy.

A support 140 may be provided with each housing cell HC for supporting the attachment A, so a plurality of the supports 140 may be provided with the stacker 100. The support 140 may be configured into single block structure supporting the attachment A at one support point or a plurality of block structures supporting the attachment A at a plurality of supporting points spaced apart in the first direction I.

However, the support 140 may include various structures instead the block structures as long as the attachment A may be sufficiently supported in the housing cell HC and the support 140 may be sufficiently controlled by the attachment changer 300.

For example, each of the supports 140 may include a detection block 142 and a support block 144 that may be arranged and spaced apart in the first direction I in each housing cell HC. A position guide 146 may be further provided for determining the support point at which the attachment A may be supported by the support block 144.

Figure 3A:
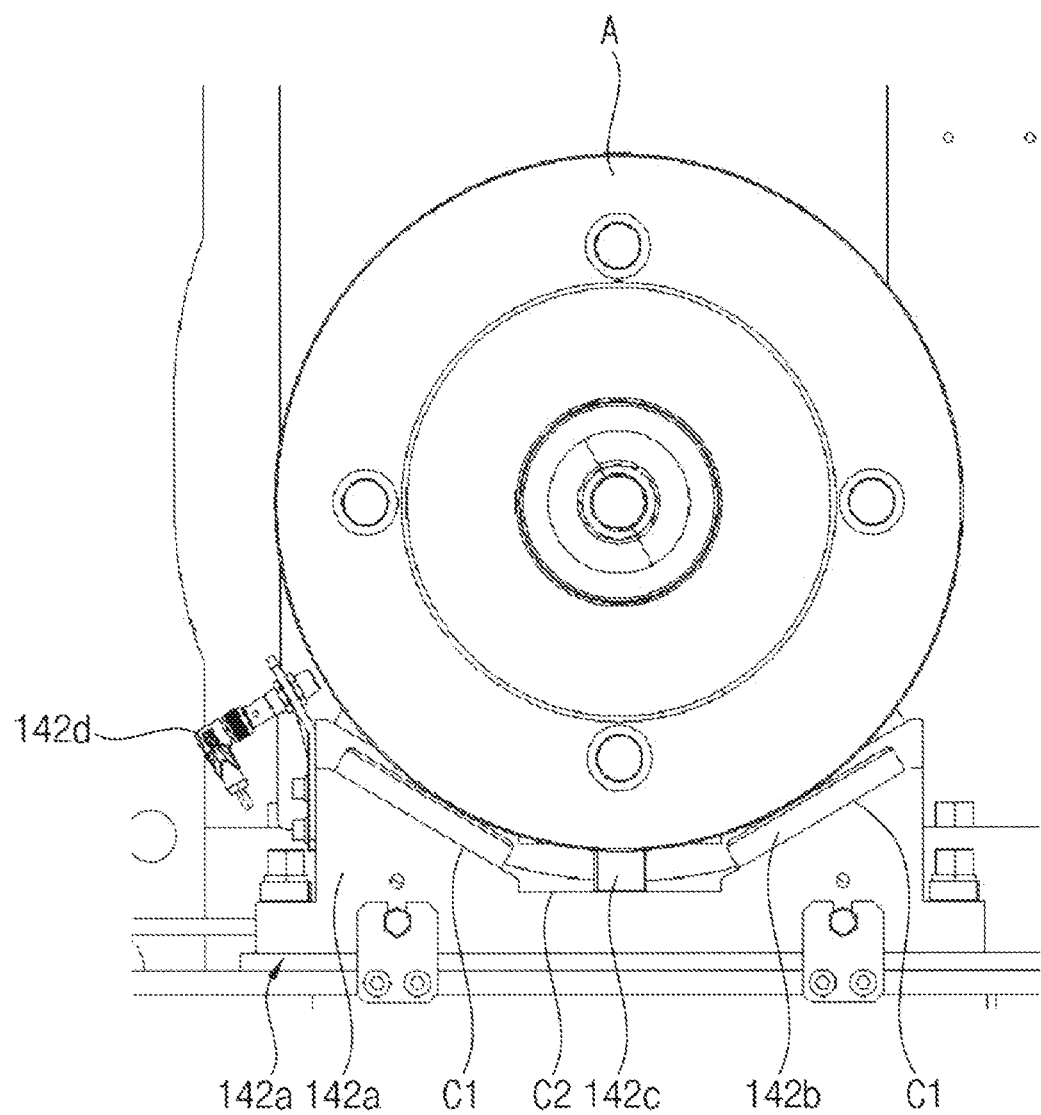
FIG. 3A is a plan view illustrating the detection block shown in FIG. 2B.
Figure 3B:
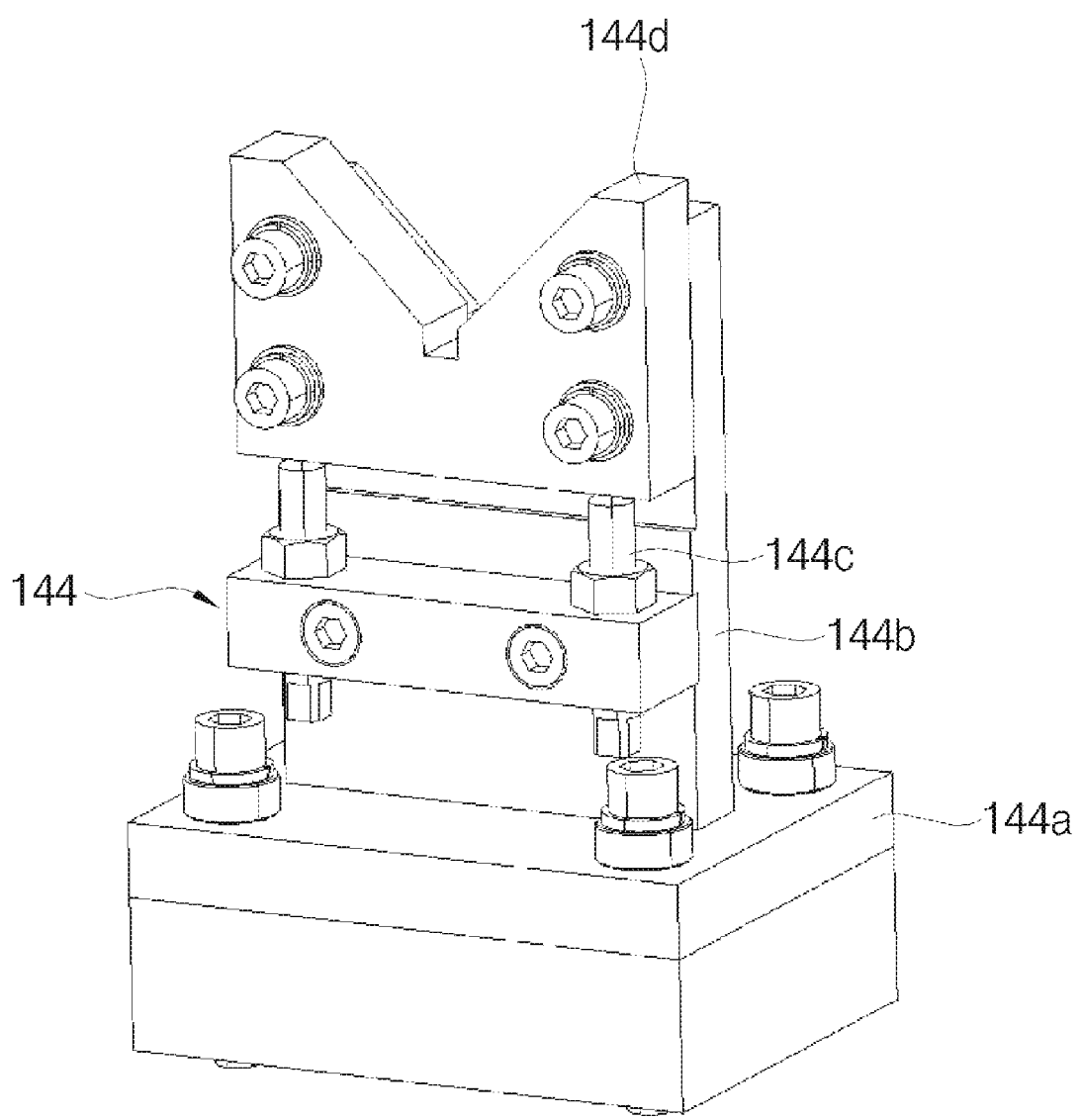
FIG. 3B is a perspective view illustrating the support block shown in FIG. 2B.

FIG. 3A is a plan view illustrating the detection block shown in FIG. 2B and FIG. 3B is a perspective view illustrating the support block shown in FIG. 2B.

Referring to FIG. 3A, the detection block 142 may include a detection body 142a, a contact pad 142b, a head position pin 142c and a first signal generator 142d. The detection body 142a may be secured to a bottom of the housing cell HC and may include a V-shaped groove at a top portion and the attachment A may be contact with the V-shaped groove of the detection body 142a. The detection body 142a may include a pair of slanted contact surfaces C1 that may be separated from each other and contact with the attachment A and a single connection surface C2 connecting the separated contact surfaces C1. The head portion H of the attachment A may be contact with the contact surfaces C1 and may be supported by the V-shaped groove of the detection body 142a. Particularly, each of the contact surfaces C1 may be selectively covered by the contact pad 142b, and the head portion H may be positioned on the contact pad 142b. Therefore, the friction force between the head portion H and the V-shaped groove may increase by the contact pad 142b. The head position pin 142c may be protruded from the connection surface C2 and be inserted into a position hole (not shown) of the head portion H when the attachment A may be positioned on the V-shaped groove of the detection body 142a. When the attachment A may be sufficiently well positioned on the detection block 142, the first signal generator 142d may generate a housing signal indicating that the attachment A may be received in the housing cell HC.

The head position pin 142c may include a rod and a pin having a sufficient strength and stiffness and the first signal generator 142d may be arranged at a side portion of the detection body 142a with facing a circumferential surface of the head portion H of the attachment A. In such a case, the first signal generator 142d may be secured to the side portion of the detection body 142a by using a bracket (not shown).

When the attachment A may be received in the housing cell HC, the head portion H of the attachment A may be supported by the V-shaped groove of the detection body 142a and the head position pin 142c may be inserted into the position hole penetrating into the circumferential surface of the head portion H. Thus, the rotation and the linear motion of the attachment A may be sufficiently prohibited by the head position pin 142c and the attachment A may be stationary fixed in the housing cell HC.

When the head position pin 142c may be sufficiently inserted into the position hole of the head portion H, the first signal generator 142d may generate the housing signal. The housing signal may indicate that the attachment A may be sufficiently received and stably positioned in the housing cell HC. The housing signal may be transferred to the attachment changer 300 and the numerical controller (not shown) of the boring machine for conducting an automatic attachment change.

Referring to FIG. 3B, the support block 144 may support the attachment A in the housing cell HC. Particularly, the tail portion T of the attachment A may be supported by the support block 144 at an inside of the housing cell HC.

For example, the support block 144 may include a horizontal base 144a, a vertical base 144b, a height controller 144c and a support plate 144d. The horizontal base 144a may be secured to the bottom of the housing cell HC and the vertical base 144b may extend upwards in the second direction II from the horizontal base 144a. The height controller 144c may be arranged at a side surface of the vertical base 144b and may reciprocate upwards and downwards in the second direction II. Thus, a vertical height of the height controller 144c may be varied in the second direction II. The support plate 144d may be arranged on a top portion of the height controller 144c and may move upwards and downwards according to the vertical movement of the height controller 144c. The support plate 144d may have a V-shaped groove at a top portion and the tail portion T of the attachment A may be inserted into the V-shaped groove.

Accordingly, the tail portion T of the attachment A may be supported by the V-shaped groove of the support plate 144d in the housing cell HC. Particularly, when the tail portion T may be relatively long in the first direction I, a plurality of the support blocks 144 may be provided in series in the first direction I, and the tail portion T may be supported at a plurality of support points.

As a result, the head portion H of the attachment A may be supported by the detection block 142 around the inlet of the housing cell HC and the tail portion T of the attachment A may be supported by the support block 144 in the housing cell HC. The number of the support blocks 144 may be varied according to the length of the tail portion T of the attachment A. Various attachments may be received in each housing cell HC regardless of their own lengths and may be sufficiently supported by the support 140.

For example, the support 140 may further include at least a position guide 146 that may be secured to the bottom of the housing cell HC and the support block 144 may be coupled to the position guide at various coupling positions. Thus, the support block 144 may move on the position guide 146 across the coupling positions and may be coupled to the position guide 146 at the support point which is one of the coupling positions. Thus, the support point at which the support block 144 may support the tail portion T may be chosen among the coupling positions according to the length of the tail portion T in the housing cell HC.

Figure 4:
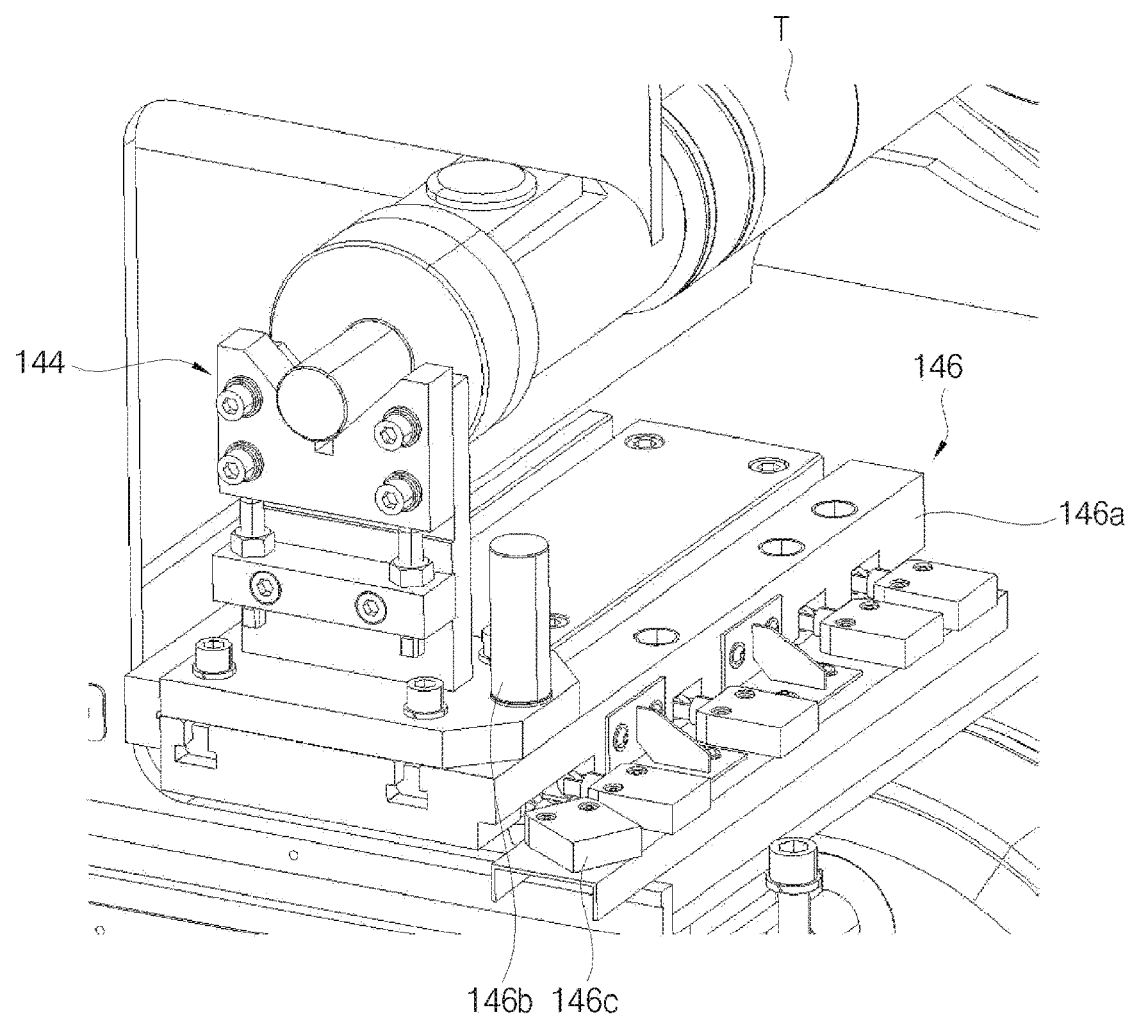
FIG. 4 is a perspective view illustrating the position guide of the support in accordance with an example embodiment of the present inventive concept.

FIG. 4 is a perspective view illustrating the position guide of the support in accordance with an example embodiment of the present inventive concept.

Referring to FIG. 4, the position guide 146 may include a body plate 146a secured to the bottom of the housing cell HC and extending in the first direction I, a coupler 146b coupling the horizontal base 144a of the support block 144 to the body plate 146a and a plurality of second signal generators 146c generating a position signal indicating a relative position of the horizontal base 144a with respect to the body plate 146a. The position signal may be transmitted to the attachment changer 300 and may function as attachment data for the automatic attachment change.

For example, the body plate 146a may have a sufficient strength and stiffness for supporting the support block 144. A plurality of lower couple holes LCH may be provided on the body plate 146a at every coupling position and a single upper couple hole UCH may be provided with the horizontal base 144a. The upper couple hole UCH and one of the lower couple holes LCH may be provided as a joint hole, and the coupler 146b may be inserted in the joint hole at a specified coupling position. For example, the coupler 146b may include a connection rod.

When the horizontal base 144a may move on the body plate 146a and the upper couple hole UCH of the horizontal base 144a may be aligned with a predetermined one of the lower couple holes LCH, the coupler 146b may be inserted through the upper couple hole UCH to the predetermined lower couple hole LCH and the joint hole may be filled with the coupler 146b. Thus, the horizontal base 144a of the support block 144 may be coupled to the body plate 146a by the coupler 146b and the support block 144 may be stationary positioned on the position guide 146 at the coupling position. Since the support block 144 may support the tail portion T of the attachment A at the coupling position, the coupling position may function as a support point of the support block 144.

In changing the horizontal base 144a of the support block 144, the coupler 146b may be released from the joint hole and the horizontal base 144a may move on the body plate 146a in such a way that the upper couple hole UCH of the horizontal base 144a may be aligned with another lower couple hole LCH of the body plate 146a and a new joint hole may be provided between the horizontal base 144a and the body plate 146a. Then, the coupler 146b may be inserted again into the new joint hole, and as a result, the support point of the support block 144 may be changed.

The second signal generator 146c may be provided beside every lower couple hole LCH, so a plurality of the second signal generators 146c may be positioned at a side portion of the body plate 146a. When the coupler 146b may be inserted downwards to the lower couple hole LCH and the support block 144 may be sufficiently coupled to the body plate 146a at the coupling position, the second signal generator 146c corresponding to the lower couple hole LCH, which may be filled with the coupler 146b, may generate a position signal indicating the coupling position at which the horizontal base 144a of the support block 144 may be stationary positioned on the position guide 146. Thus, the coupling position or the support point of the support block 144 may be easily detected in the housing cell HC by the second signal generator 146c. The coupling position or the support point of the support block 144 may be used as a reference data for the automatic attachment change process in the attachment changer 300.

Since the support point of the support block 144 may be varied on the position guide 146 in the first direction I, various attachments A having various tail lengths may be received in a single housing cell HC. Particularly, when the length variation of the tail portion T may be sufficiently large, a single support block 144 and a single position guide 146 may be prefer to a plurality of the support blocks 144.

In an example embodiment, the stacker carrier 200 may be operated in response to instructions of the attachment changer 300.

Figure 5:
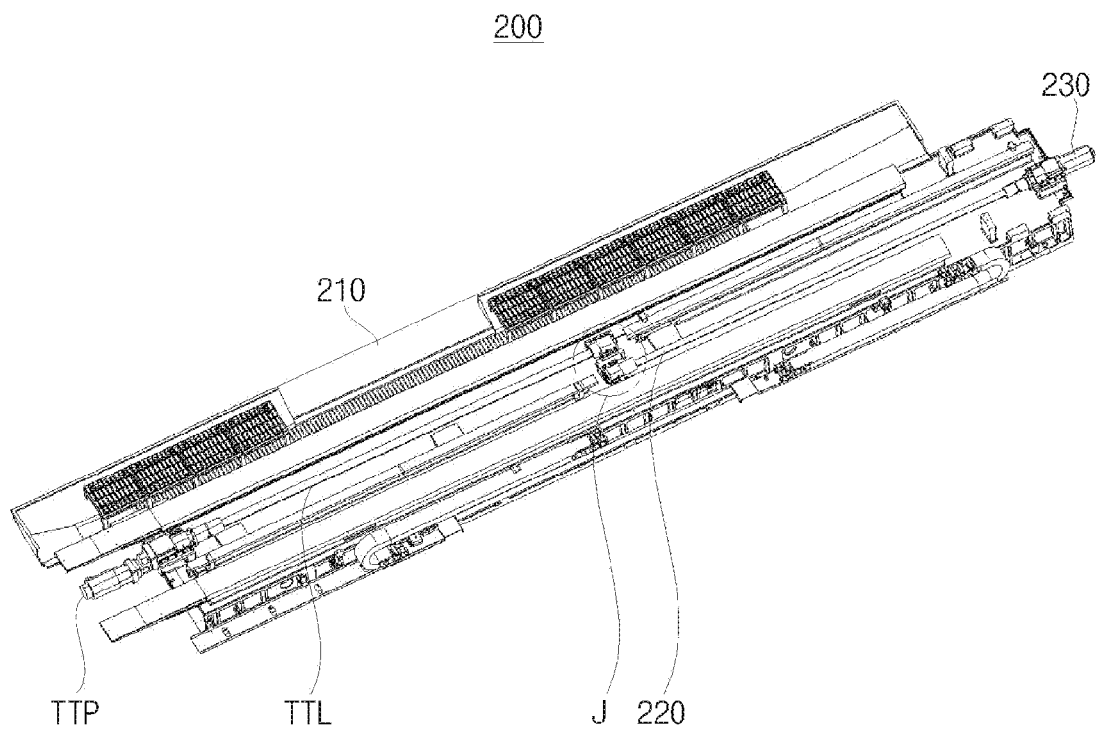
FIG. 5 is a perspective view illustrating the stacker carrier of the AAC shown in FIG. 1 in accordance with an example embodiment of the present inventive concept.

FIG. 5 is a perspective view illustrating the stacker carrier of the AAC shown in FIG. 1 in accordance with an example embodiment of the present inventive concept.

Referring to FIG. 5, the stacker carrier 200 may include a carrier body 210 secured to the stacker 100, a body transfer 220 combined with the carrier body 210 and transferring the carrier body 210 and a carrier power 230 driving the body transfer 220.

For example, the carrier body 210 may be combined to the body transfer 220 at a bottom portion and be combined to the stacker 100 at a top portion. The carrier body 210 may further include various inner structures (not shown) that may enable the carrier body 210 to move relatively with respect to the body transfer 220 and a motion controller (not shown) for controlling the motion of the body transfer 220.

The body transfer 220 may be combined with the carrier body 210 and may drive the carrier body 210 to move toward a table of the boring machine or backward from the table of the boring machine. Since the stacker 100 may be combined to the carrier body 210, the stacker 100 may also move toward or backward from the table of the boring machine by the movement of the carrier body 210.

A driving power may be applied to the body transfer 220 by the carrier power 230. In the present example embodiment, the body transfer 220 may include a ball screw that may coupled to the carrier body 210 and the carrier power 230 may include a servo motor for driving the ball screw.

Particularly, an end portion of the body transfer 220 may be overlapped with a table transfer line TTL at a junction point. Thus, the carrier body 210 may be transferred to the table of the boring machine from the body transfer 220 through the table transfer line TTL, and as a result, the stacker 100 may be directly transferred to the table of the boring machine. A driving power may be applied to the table transfer line TTL by the table transfer power TTP.

At first, the carrier body 210 may be located at a standby area. In such a case, the attachment change may not occur and the workpiece on the table may undergo a boring process by using a boring tool secured to a working attachment. When an attachment change signal may be detected by the attachment changer 300, the carrier body 210 may be transferred to an attachment change position along the table transfer line TTL by the body transfer 220 in such a configuration that the select attachment is aligned with the spindle assembly. When the attachment change may be completed, the carrier body 210 may be returned to the standby area along the table transfer line TTL by the body transfer 220.

Referring again to FIG. 1, the attachment changer 300 may be connected to the numerical controller of the boring machine and may control the stacker 100 and the stacker carrier 200 according to the steps of the boring process. Thus, the attachment A may be automatically changed in the boring process under the control of the attachment changer 300.

For example, the attachment changer 300 may be provided as a control box that may be electrically connected to the stacker 100 and the stacker carrier 200. In addition, the attachment changer 300 may be further connected to the numerical controller of the boring machine, so the attachment A may be automatically changed according to the requirements of the boring process.

For example, the attachment changer 300 may include a central process unit 310 for controlling the automatic attachment change process in response to various control signals that may be applied by the numerical controller or an operator of the boring machine, a spindle analyzer 320 for analyzing the spindle assembly of the boring machine prior to conducting the automatic attachment change process to thereby generate spindle analysis data, a data storage unit 330 for storing attachment data such as the specifications and positions of each attachment A in the stacker 100 and an attachment change unit 340 for selecting a select attachment from the attachments in the stacker 100 based on the current spindle analysis data and the attachment data and automatically conducting an attachment change between the working attachment and the select attachment.

The central process unit 310 may include a signal processor 311 for processing various control signals between the AC changer 300 and the exterior of the AC changer 300. The signal processor 311 may receive control signals from the numerical controller or an operator and may transmit operation signals and state signals from the spindle analyzer 320, the data storage unit 330 and the attachment change unit 340.

For example, the control signals may include an operation signal such as an attachment change signal and a change completing signal and a state signal. The control signals may be received by the signal processor 311 and the central process unit 310 may transmit the control signals to the spindle analyzer 320, the data storage unit 330, the attachment change unit 340 and the numerical controller. The attachment change may be initiated in response to the attachment change signal and may be completed in response to the change completing signal.

In the present example embodiment, the central process unit 310 may be communicated with the numerical controller by a wire communication device or a wireless communication device. In addition, the central process unit 310 may be connected to a control panel that may be installed to the attachment changer 300 and have a user interface for the operator.

When the attachment change signal may be applied to the central process unit 310, the central process unit 310 may drive the spindle analyzer 320 to operate at first. Thus, the current state of the spindle assembly may be analyzed and be generated as the spindle analysis data. For example, the spindle analysis data may include an empty state indicating that no attachment or no tools may be combined to the spindle assembly, a dummy state indicating that a dummy attachment may be combined to the spindle assembly, an attach state indicating that a working attachment may be combined to the spindle assembly and a tool state indicating that a working tool may be combined to the spindle assembly. The spindle analyzer 320 may transfer the spindle analysis data to the central process unit 310.

The central process unit 310 may transfer the attachment change signal to the data storage unit 330 and the attachment change unit 340 together with the spindle analysis data for initiating the attachment change operation.

Various attachment data may be stored in the data storage unit 330. For example, the attachment data may include the specifications of the attachments A stacked in the stacker 100, a cell data regarding the housing cell HC in which the attachment A may be received and the support point at which the attachment A may be supported in the housing cell HC.

Particularly, the attachment data may be provided as a digital data. Thus, the data storage unit 330 may include a hard disk device and a flash memory device, and the attachment data may be stored according to a predetermined data structure.

Figure 6A:
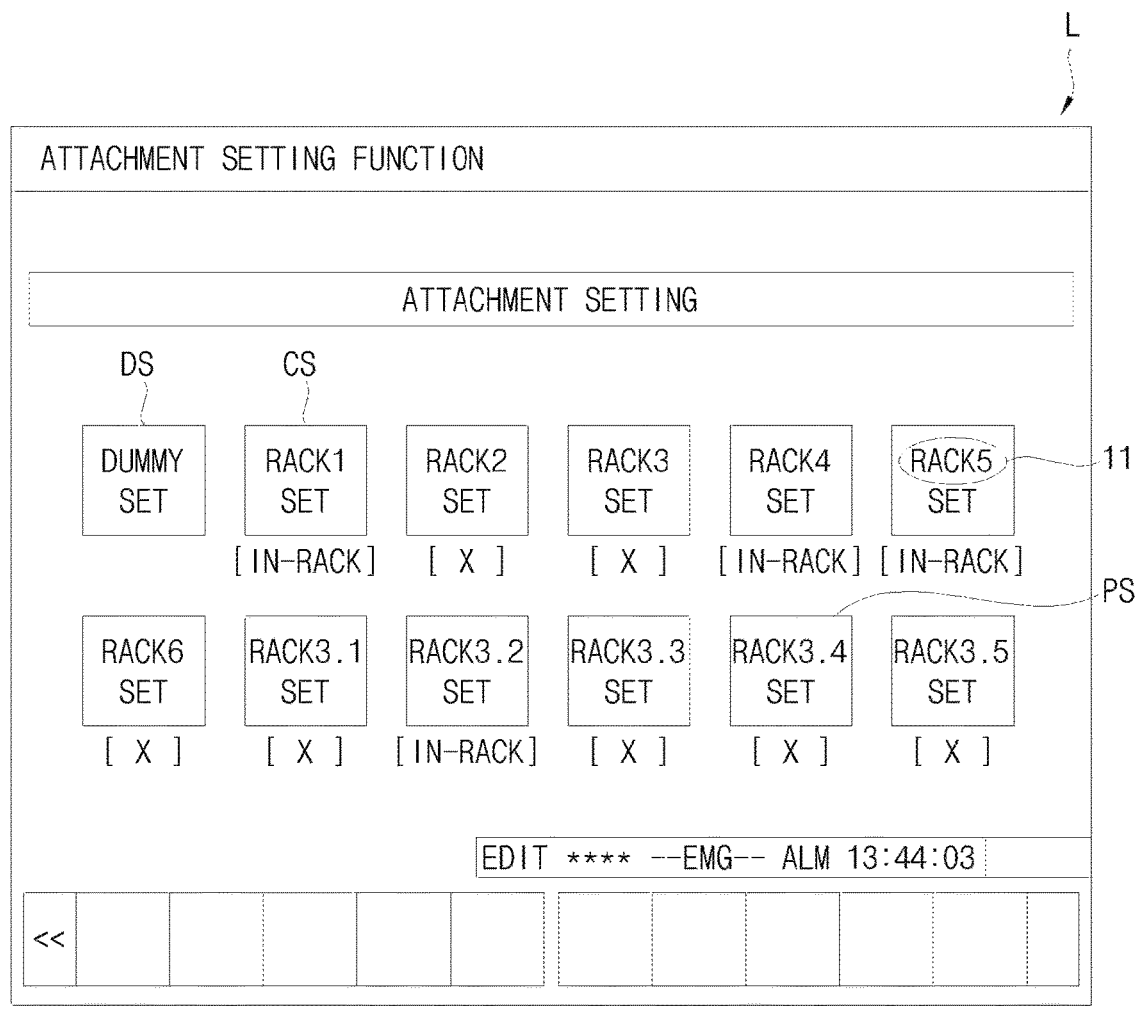

FIGS. 6A and 6B are views illustrating a data structure by which the attachment data may be stored in the data storage unit in accordance with an example embodiment of the present inventive concept. FIG. 6A illustrates an editor screen of the control panel on which the attachment data may be edited by screen touch signals.

Referring to FIG. 6A, the attachment data may be firstly sorted by a unit of the housing cell HC and the attachment data at each housing cell HC may be secondly sorted by attachment characteristics such as a physical shape, a operation characteristic and a support point of the attachment.

When a data edit signal may be transferred to the central process unit 310, the screen of the control panel may be changed into an edit mode and a data list L may be displayed on the screen. Each housing cell HC of the stacker 100 may be identified by a cell number 11 in the data list L.

In the present example embodiment, the data list L may include a dummy setter DS for setting the data about the dummy attachment, at least a cell setter CS for setting the data about the attachments received in each housing cell HS and at least a preparatory setter PS for preparatorily setting the reserve data about a reserve housing cell or about any other data about the attachment A. Since the stacker 100 may include 6 housing cells HC, first to sixth cell setters CS may be displayed on the edit screen and identified as 6 different cell numbers 11 may be assigned, respectively, as RACK1 SET to RACK6 SET. The cell number 11 may be varied according to the number of the housing cell HC in the stacker 100. In the same way, a plurality of the preparatory setters PS may be displayed on the edit screen and identified as 5 different numbers may be assigned, respectively, as RACK3.1 SET to RACK3.5 SET.

When the dummy setter DS, one of the cell setters CS or one of the preparatory setters PS may be selected on the edit screen, the edit screen may be changed and a setting menu SM may be displayed on the edit screen. The attachment data of the dummy attachment and the stacked attachment in the stacker 100 and the reserve and any other data may be modified or inputted by the operator.

FIG. 6B is a view illustrating the setting menu for modifying the attachment data of the attachment A received in a housing cell assigned as RACK1 SET in FIG. 6A.

Referring to FIG. 6B, the setting menu SM may include an option menu 20 and a data display menu 30. The option menu 20 may display the contents of the attachment data and may be selectively activated by the operator. The attachment data corresponding to the content of the option menu 20 may be displayed and may be modified simultaneously with the activation of the option menu 20 in the data display menu 30.

For example, the option menu 20 may include an identifier menu 21 for setting the identification information on the housing cells HC and the attachments A, a characteristic menu 22 for setting the physical shape and the operation characteristics of the attachment A and a shaft menu 23 for setting the support point of the attachment A. Particular specifications of the attachment data may be inputted or modified at the data display menu 30 corresponding to each of the identifier menu 21, the characteristic menu 22 and the shaft menu 23.

The data display menu 30 may include an identifier display menu 31 corresponding to the identifier menu 21. For example, the identifier menu 21 may include a model number of the attachments A in the corresponding housing cell HC, an identification number of an individual attachment in the corresponding housing cell HC and the cell number of the corresponding housing cell HC, and the model number, the identification number and the cell umber may be inputted or modified at the corresponding identifier display menu 31.

The data display menu 30 may include a characteristic display menu 32 corresponding to the characteristic menu 22. For example, the characteristic menu 22 may include a coupling option to the attachment A, a length of the attachment A, a speed of the spindle to which the attachment A may be combined, a maximal rotation speed of an adapter of the attachment A and a transfer characteristics of the adapter, and the specifications of each characteristics data may be inputted or modified at the corresponding characteristic display menu 32.

The data display menu 30 may include a shaft display menu 33 corresponding to the shaft menu 23. For example, the shaft menu 23 may include a corrected position of a spindle origin, a stroke of the attachment adapter and a gear ratio, and the specifications of each shaft data may be inputted or modified at the corresponding shaft display menu 33.

Each of the option menu 20 and the data display menu 30 may be toggled between an activation mode and an inactivation mode on a touch screen and the attachment data may be inputted or modified when the option menu 20 may be activated automatically or manually. Particularly, when the attachment changer 300 may be connected to the numerical controller, all the attachment data may be automatically transferred to the data storage unit 330 as a single data file. The data file may be generated by a manufacturer of the boring machine based on the data structure shown in FIGS. 6A and 6B, so that most of the attachment data may be automatically transferred to the data storage unit 340, thereby minimizing the manual input or modification of the attachment data.

The configurations of the setting menu SM and the data structure in the data storage unit 330 may be varied in accordance with the characteristics of the boring machine having the AAC 500 and the characteristics of the attachments A in the stacker 100.

The attachment change unit 340 may conduct the attachment change based on the spindle analysis data and the attachment data.

For example, the attachment change unit 340 may include a position detector 341 for detecting a change position at which the attachment A may be changed based on the attachment data, a stacker driver 342 for driving the stacker to move to the change position in such a configuration that the select attachment in the stacker 100 may be aligned with the spindle assembly, and a change controller 343 for controlling the automatic attachment change process by various control signals.

The position detector 341 may call up the attachment data of the select attachment and the position of the spindle assembly from the data storage unit 330 and may determine the change position at which the select attachment may be combined to the spindle assembly.

FIG. 7 is a view illustrating a change position setting menu from the attachment data shown in FIG. 6B.

Referring to FIG. 7, the change position setting menu EP may include a selection menu 40 for selecting the coordinate components of the change position and a value input menu 50 for individually inputting coordinate values at every coordinate component.

For example, the selection menu 40 may include a spindle selection menu 41 for selecting the coordinate position of the spindle assembly, an adapter selection menu 42 for selecting the coordinate position of the adapter to which the attachment A may be combined and a stacker selection menu 43 for selecting the coordinate position of the stacker 100 in which the select attachment may be stacked. The coordinate positions of the spindle assembly, the adapter and the stacker 100 may be individually inputted in the value input menu 50. Thus, the change position may be determined by the spindle position, the adapter position and the stacker position.

The value input menu 50 may include a spindle input menu 51 corresponding to the spindle selection menu 41, and 3-dimensional coordinate values of the spindle position may be inputted in the spindle input menu 51. In addition, the value input menu 50 may include an adapter input menu 52 corresponding to the adapter selection menu 42, and 2-dimensional coordinate values of the adapter position may be inputted in the adapt input menu 52. Further, the value input menu 50 may include a stacker input menu 53 corresponding to the stacker selection menu 43, and 1-dimensional coordinate value of the stacker position may be inputted in the stacker input menu 53.

The spindle position and the adapter position may be automatically set in the value input menu 50 or may be manually set in the value input menu 50 according to the configurations of the boring machine including the AAC 500.

Particularly, when the boring machine may be controlled by the numerical controller, all of the spindle position and the adapter position or some of the spindle position and the adapter position may be automatically set in the value input menu 50 in communication with the numerical controller and the central process unit 310.

For example, the attachment data of the select attachment may be called up from the data storing unit 330 by the central process unit 310 and the working positions of the working attachment and the adapter 613 may be obtained from the numerical controller. The working positions may be transferred to the central process unit 310. Thereafter, the change position may be calculated from the attachment data of the select attachment and the working positions.

In a modified example embodiment, the operator may be manually input the coordinate values in the value input menu 50 in consideration of the spindle analysis data. As the operator may watch every coordinate values of the attachment position, the spindle position and the adapter position from the change position setting menu EP of the screen, the input of the coordinate values by the operator may be minimized for changing essential coordinate values for determining the change position.

For example, the change position setting mode EP may further include a current position window CPW in which the current coordinate values of the spindle position, the adapter position and the stacker position. Thus, the coordinate value deviation between the coordinate values of the current position and the coordinate values of the change position may be instantly obtained and the operator may just change some of the value input menu 50 at which the coordinate value deviation may occur.

Accordingly, when the operator may manually input the coordinate values in the value input menu 50 in consideration of the spindle analysis data, the input mistake or the input omission may be minimized by using the current position window CPW. Thus, the change position may be efficiently and accurately detected and set in the attachment change unit 340.

The stacker driver 342 may drive the stacker 100 to move to the change position in such a configuration that the select attachment in the stacker 100 may be aligned with the spindle assembly. Thereafter, the select attachment may be automatically combined to the spindle assembly. The change controller 343 may generate some control signals for controlling the position detector 341 and the stacker driver 342. The change controller 343 may be under the control of the central process unit 310 that may be connected to the central process unit, so the change controller 343 may control the position detector 341 and the stacker driver 342 according to the process steps of the boring machine.

When the attachment change signal may be applied to the central process unit 310 of the attachment changer 300 together with the attachment data of the select attachment, the spindle state may be firstly checked by the spindle analyzer 320 and the spindle analysis data may be transmitted to the attachment change unit 340. When the spindle state may be checked to be an empty state, the attachment changer 300 may be set into a combination mode and the select attachment in the stacker 100 may be automatically combined to the adapter 613 at the change point.

In contrast, when the spindle state may be checked to be a dummy state or an attach state, the attachment changer 300 may be operated under a detachable mode at firstly, and the dummy attachment or the working attachment may be separated from the spindle adapter. Thereafter, the attachment changer 300 may be set again into the combination mode and the select attachment in the stacker 100 may be automatically combined to the adapter 613 at the change point.

When the select attachment may be combined to the spindle assembly, the change controller 343 may generate an attach signal and when the working attachment or the dummy attachment may be separated from the spindle assembly, the change controller 343 may generate a detach signal. When the select attachment may be combined to the spindle assembly and the stacker 100 may return to the standby position, the change controller 343 may generate the change completing signal.

According to the example embodiment of the automatic attachment changer, the change position may be automatically detected and the stacker 100 including the select attachment may be transferred to the change position at which the select attachment may be combined to the spindle assembly. The specifications of the select attachment may be automatically detected from the data storage unit 330.

According to the conventional attachment change process, the select attachment may be individually extracted from an attachment magazine and may be individually and manually transferred to the change position by the operator. In contrast, according to the present inventive concept of the attachment change process, the stacker including the select attachment itself may be automatically transferred to the change position and the select attachment may be automatically combined to the spindle assembly. The detection of the change position, the transfer of the stacker and the attachment change at the spindle assembly may be automatically conducted in the boring machine, thereby conducting the attachment change at the correct change position that may be automatically determined based on the attachment data and the spindle analysis data. Accordingly, the tool damages and the boring errors caused by an inaccurate attachment change may be prevented or minimized in the boring machine including the automatic attachment changer.

FIG. 8 is a perspective view illustrating a boring machine including the automatic attachment change shown in FIG. 1 in accordance with an example embodiment of the present inventive concept. In FIG. 8, a horizontal boring machining center is exemplarily disclosed as the boring machine. However, the automatic attachment changer may also be applied to any other machining centers as long as the tool is horizontal with the table of the machining center.

Referring to FIG. 8, the boring machine 1000 in accordance with an example embodiment of the present inventive concept may include a spindle assembly 600 secured to a column structure C that may move in a first direction I and extend in a second direction II substantially perpendicular to the first direction I and selectively combined with a select attachment, a table 700 to which a workpiece (not shown) may be secured and moving in a third direction III substantially perpendicular to the first direction I and the second direction II, and an automatic attachment changer 500 having a stacker 100 in which a plurality of attachments A may be arranged horizontally with respect to the table 700 and connected to the table 700 in a line movably in the third direction III. The automatic attachment changer 500 may control the stacker to be aligned with the spindle assembly 600 and automatically conducting an attachment changer with the select attachment in response to an attachment change signal. The boring machine 1000 may further include a numerical controller 800 for generating the attachment change signal and controlling a boring process under numerical control algorithms. Thus, the boring machine 1000 may include a boring machining center in which the boring process may be controlled by the numerical controller 800.

For example, a bed structure may be provided in the boring center 1000 and the column structure C may be positioned at a side of the bed structure and the table 700 may be positioned at another side of the bed structure opposite to and facing the column structure C. The column structure C may be shaped into a rod structure extending to a predetermined height in the second direction II and may move in the first direction I on the bed structure. The table 700 may move in the third reaction III on the bed structure. The spindle assembly 600 may be secured to the column structure C and the tools and the attachments for the boring process may be combined to the spindle assembly 600.

In addition, the column structure C may function as an operation base for an automatic tool changer (not shown) and the automatic attachment changer 500, and thus the mechanical vibration and external disturbances may be absorbed by the column structure C, to thereby increase the accuracy of the automatic tool change and/or the automatic attachment change.

The spindle assembly 600 may be secured to the column structure C movably in the second direction II and the third direction III, so the position of the spindle assembly 600 may be varied on a surface defined by the width and the height of the column structure C. The spindle assembly 600 may also move in the first direction I as the movement of the column structure C. Accordingly, the spindle assembly 600 may move in three dimensional directions in the boring machine 1000. In the present example embodiment, the boring machine may be configured into a horizontal type in which an axis of the spindle assembly 600 may be horizontal with respect to the table 700 or the bed structure.

Figure 9:
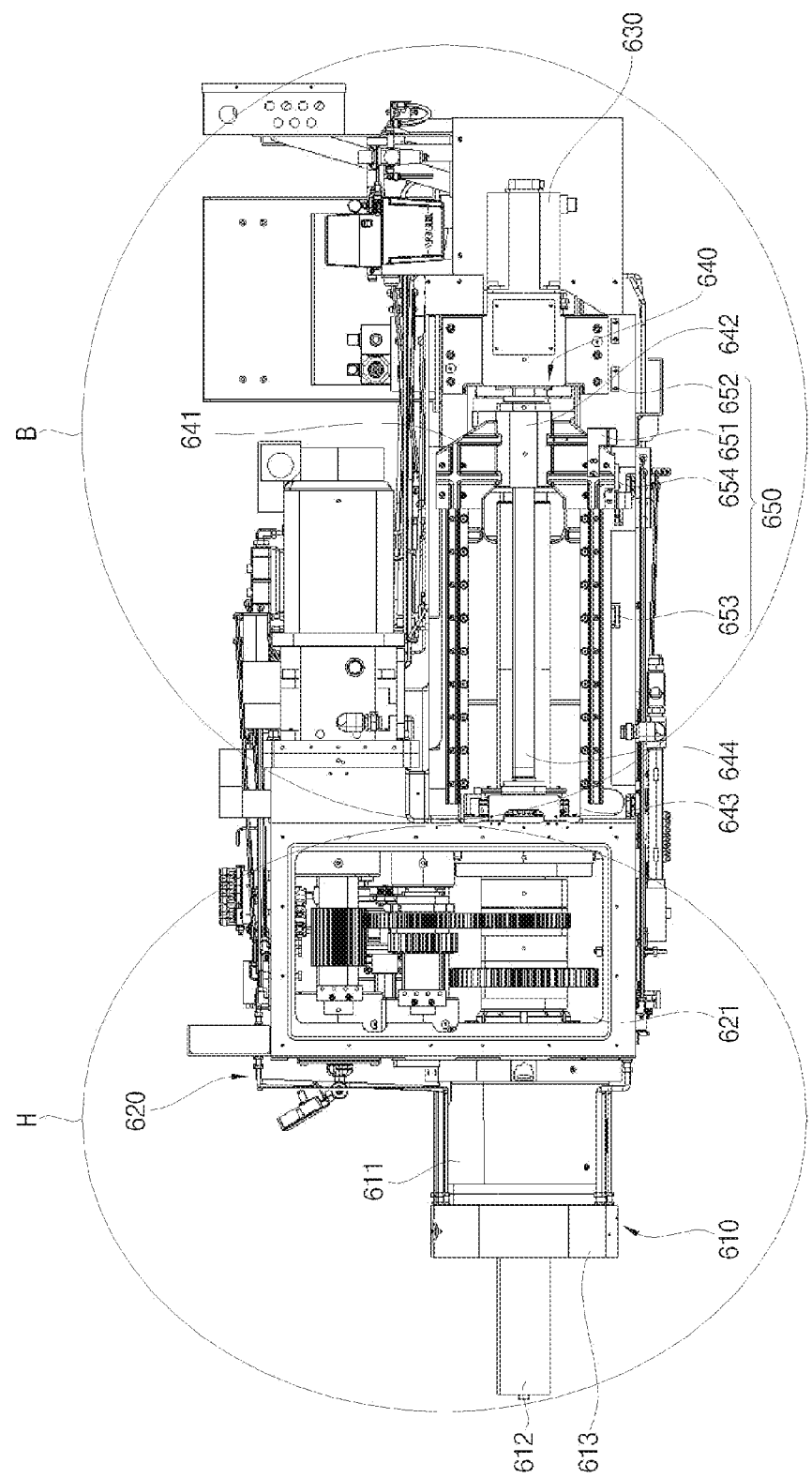
FIG. 9 is a structural view illustrating the spindle assembly of the boring machine shown in FIG. 8.

FIG. 9 is a structural view illustrating the spindle assembly of the boring machine shown in FIG. 8.

Referring to FIG. 9, the spindle assembly 600 may include a spindle head H having a combining structure at a front portion and a spindle body B having a driving structure at a rear portion. Various boring tools and/or attachments may be combined to the combining structure and the driving structures may drive the combining structure. The combining structure may include a spindle structure 610 to which the tools and/or the attachments may be combined and a flange structure 620 to which the spindle structure 610 may be secured. The driving structure may include a power source 630 for generating a driving power for the spindle structure 610, a power shaft 640 for transferring the driving power to the spindle structure 610 and a shaft detector 650 detecting a position of the power shaft 640.

For example, the spindle structure 610 may include a spindle body 611, the rotation axis 612 penetrating through a central portion of the spindle body 611 and linearly moving in the first direction I with respect to the column structure C and an adapter 613 secured to the spindle body 611 and to which the attachment A may be combined.

A boring tool may be combined to the rotation axis 612 and may be rotated according to the rotation of the rotation axis 612, so the workpiece may be processed by the rotating boring tool. The attachment A may be selectively combined to the adapter 613 in view of the tool configuration and the boring accuracy. A special boring process or any other process instead the boring process may also be conducted by a proper selection of the attachment A. For example, a milling process can be conducted in the boring machine just by using a proper attachment A.

The flange structure 620 may include a gear assembly 621 for controlling the rotation speed of the rotation axis 612. The rotation speed of the rotation axis 612 may be controlled in view of the specifications and usage of the attachment A.

The power source 630 may include a servo motor for generating the driving power by which the rotation axis 612 may be rotated. The power shaft 640 may transfer the driving power to the gear assembly 621 and may include a first transmission shaft 642 and a second transmission shaft 644. The first transmission shaft 642 may be positioned in a first power chamber 641 and the second transmission shaft 644 may be positioned in a second power chamber 643. Various other power transfer elements may also be arranged in the first and second power chambers 641 and 643.

A position indicator (not shown) may be provided with the first and the second power chambers 641 and 643 and may detect shaft positions of the first and second transmission shafts 642 and 644 in the first direction I, respectively. The first transmission shaft 642 may be configured to be movable in the first direction I and a position of a shaft assembly connected to the rotation axis 612 from the power source 630 may be variable according to a position (referred to first shaft position) of the first transmission shaft 642. The first shaft position may be determined when the spindle assembly 600 may be designed and may function as an origin point for a coordinate system in which the positions of each element of the boring machine 1000 may be designated in designing the boring machine 1000. For that reason, the first shaft position may be referred to as design origin point.

The second transmission shaft 644 may also be configured to move in the first direction I, and a position (referred to as second shaft position) of the second transmission shaft 644 may be varied according to the specifications of an attachment combined to the adapter 613 and the gear ratio for the combined attachment. Thus, when the attachment and the gear ratio for the attachment may be set in the boring machine 1000, the second shaft position may function as an origin point for a coordinate system in which the process positions of the workpiece may be designated in conducting the boring process. For that reason, the second shaft position may be referred to as reference point (or working origin point) of the boring process.

The shaft detector 650 may detect a position of the power shaft 640 and may include a first detection dog 651 that may be positioned in the first power chamber 641 and may detect the first shaft position and a second detection dog 653 that may be positioned in the second power chamber 643 and may detect the second shaft position. The shaft detector 650 may also include a first sensor 652 sensing the first shaft position and a second sensor 654 sensing the second shaft position. The first shaft position and the second shaft position may be transferred to the numerical controller 800 through the first sensor 651 and the sensor 653, respectively.

In addition, the first and second shaft positions may also be transferred to the attachment changer 300 and may be function as basic data for determining the attachment change position.

The table 700 may be opposite to the column structure C in the first direction I and may move along the third direction III. In the present example embodiment, a pallet P may be mounted on the table 700 and the workpiece may be secured to the pallet P in the boring process. The boring process may be conducted to the workpiece in a working area WA of the boring machine 1000 while the workpiece may be secured to the pallet P. After completing the boring process, the workpiece may be separated from the pallet P and may be removed from the boring machine 1000.

The automatic attachment changer (AAC) 500 may be arranged in a line with the table 700 along the third direction III and may be positioned at a standby area that may be spaced apart from the working area WA in the third direction III. When the boring process may be conducted in the working area WA, the AAC 500 may be positioned at the standby area. When the attachment change may be needed in the boring process, the AAC 500 may drive the stacker 100 including the select attachment to move directly to the working area from the standby area and the attachment change may be conducted automatically at the working area by the AAC 500.

The AAC 500 may include the stacker 100 having a plurality of attachments A therein, a stacker carrier 200 having a carrier body 210 secured to the stacker 100, a body transfer 220 transferring the carrier body 210 and a carrier power 230 driving the body transfer 220, an attachment changer 300 controlling the stacker 100 and the stacker carrier 200 such that the select attachment may be selected among the attachments A in the stacker 100 and the select attachment may be combined to the spindle assembly 600.

The AAC 500 of the boring machine 1000 may have substantially the same structures as the AAC 500 described in detail with reference to FIGS. 1 to 7, and thus any further detailed descriptions on the AAC 500 is omitted.

The numerical controller 800 may control the operation of the column structure C, the spindle assembly 600, the table 700 and the AAC 500 under some computer algorithms, so the numerical controller 800 may control the overall boring process to the workpiece in the boring machine 1000. A control panel CP may be provided with the numeric controller 800 as a user interface for applying operation instructions.

Particularly, the numerical controller 800 may be communicated with the central process unit 310 of the attachment changer 300, so the attachment change may be automatically conducted according to the process step of the boring process. Further, when an automatic tool changer (not shown) may be provided with the boring machining center 1000, both the automatic tool change and the automatic attachment change may be conducted in response to the process step of the boring process by the numerical controller 800.

For example, the numerical controller 800 may include an axis driver 810 for moving the rotation axis 612 in the first direction I, a column driver 820 for moving the column structure C in the first direction I and a spindle driver 830 for moving the spindle structure 610 in the second direction II.

The axis driver 810, the column driver 820 and the spindle driver 830 may be communicated with the central process unit 310 of the attachment changer 300, so the operations of the rotation axis 612, the column structure C and the spindle structure 610 may be controlled according to the process step of the boring process. Particularly, the spindle driver 830 may control the gear assembly 621 in such a way that the gear ratio of the gear assembly 621 may be changed for the select attachment in automatically changing the attachment.

The axis driver 810 may control the rotation axis 612 to move in the first direction I between the working origin point and the design origin point. The axis driver 810 may control the rotation axis 612 to move to the design origin point when the automatic attachment change may be initiated, and the axis driver 810 may control the rotation axis 612 to move to the working origin point when the automatic attachment change may be completed.

Hereinafter, the method of conducting an automatic attachment change in the boring machine shown in FIG. 8 will be described in detail.

Figure 10B:
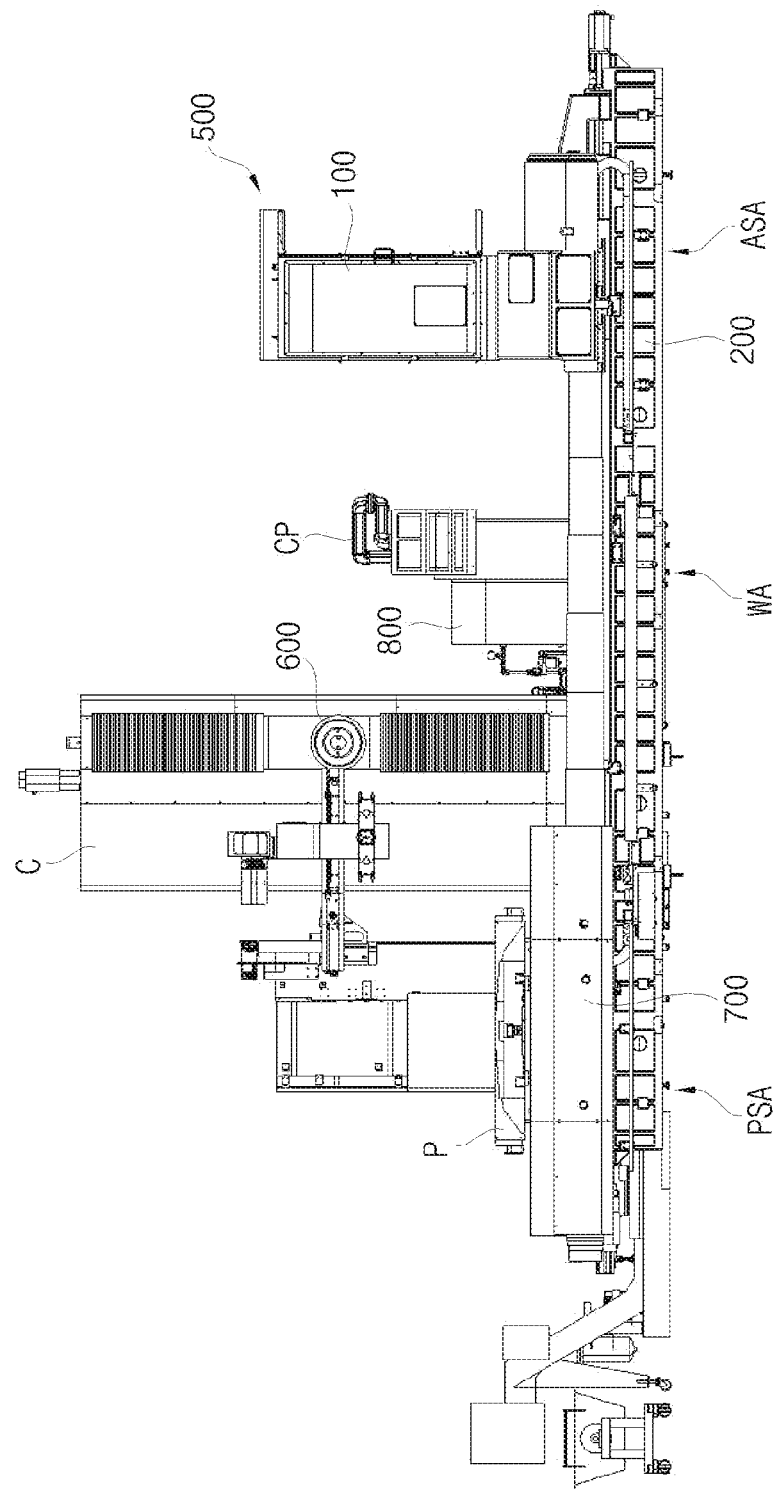
Figure 10D:
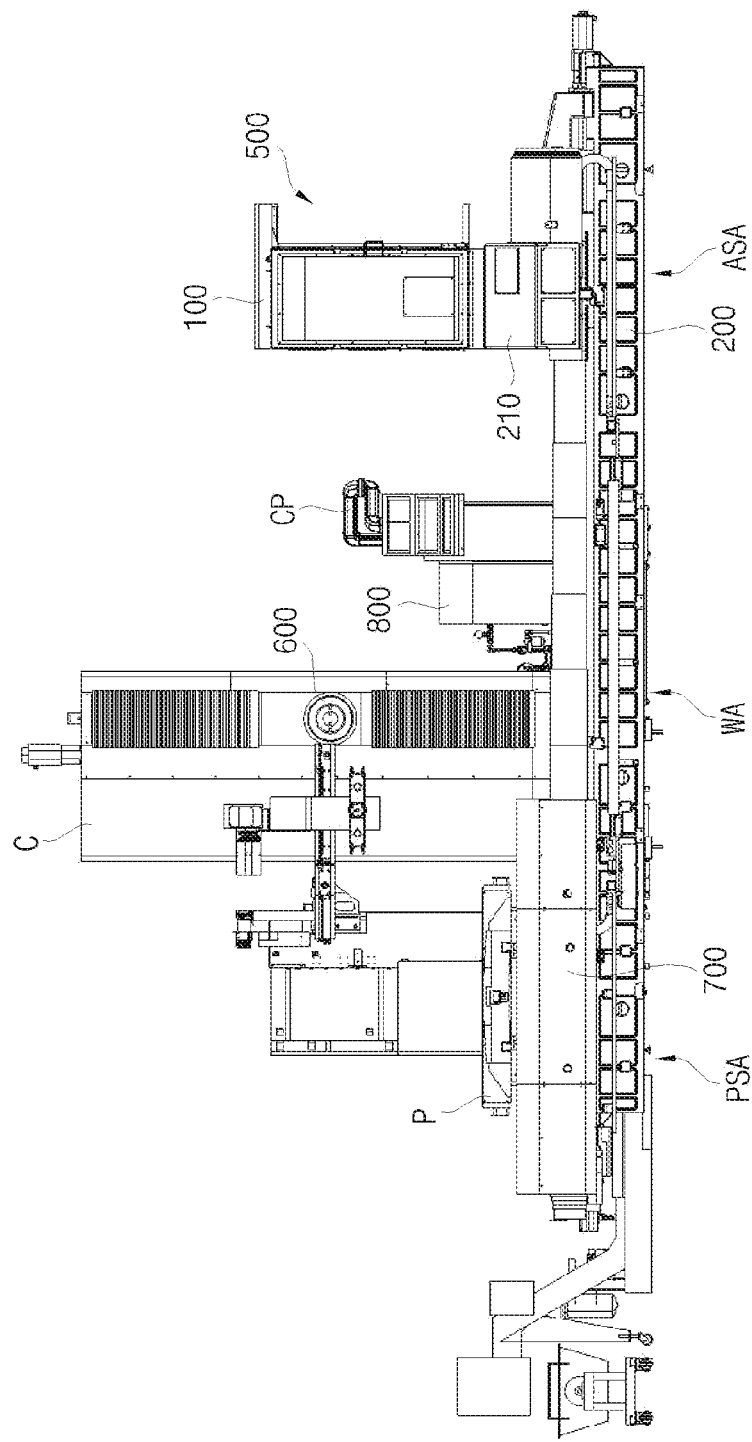
Figure 11:
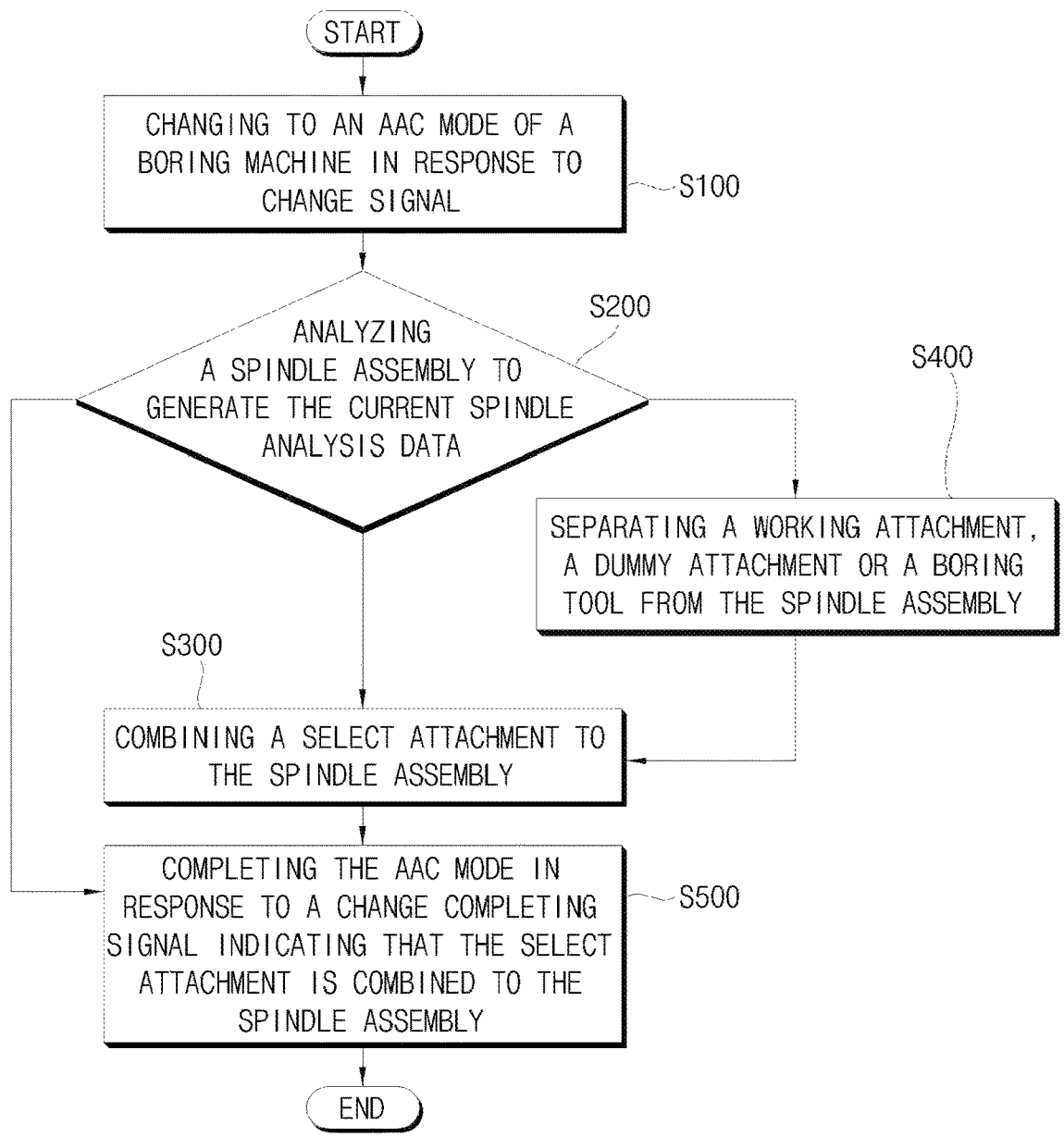
FIG. 11 is a flow chart showing the method of automatically changing attachments in the boring machine shown in FIG. 8.

FIGS. 10A to 10D are cross sectional views illustrating processing steps for a method of automatically changing attachments in the boring machine shown in FIG. 8, and FIG. 11 is a flow chart showing the method of automatically changing attachments in the boring machine shown in FIG. 8.

Referring to FIGS. 10A and 11, when the attachment change signal may be applied to the attachment changer 300 of the boring machine 1000 in which a boring process may be conducted to the workpiece, the boring machine 1000 may be changed into an automatic attachment change (AAC) mode (step S100). When the boring process may be conducted in the boring machine 1000, the pallet P holding the workpiece may be positioned in the working area WA of the boring machine 1000 and the column C and the rotation axis 612 may be positioned at the respective process positions. In contrast, when the attachment change need be conducted prior to the boring process, the pallet P may still be positioned in a pallet standby area PSA and the attachment change may be automatically conducted without pallet P in the working area WA.

The attachment change signal may be applied to the central process unit 310 of the attachment changer 300 from the numerical controller 800. The attachment change signal may be automatically generated from the numerical controller 800 according to the numerical control algorithms, and may be transferred to the attachment changer 300. In contrast, the attachment change signal may be manually applied to the attachment changer 300 when no numerical controller may be provided with the boring machine 1000. In such a case, the attachment change signal may be manually applied to the central process unit 310, and the attachment change may be automatically conducted in response to the attachment change signal under the control of the attachment changer 300.

The attachment change signal may include an identification number of the select attachment. The central process unit 310 may firstly operate the position detector 341 and the position detector 341 may call up the attachment data corresponding to the select attachment and the current state of the spindle assembly from the data storage unit 330. Then, the position detector 341 may determine the change position based on the attachment data of the select attachment and the current state of the spindle assembly 600, for example, as shown in FIG. 7. In such a case, some coordinate values of the change position may be directly set by the operator by using the interface of the control panel CP.

The stacker 100 may still be positioned at an attachment standby area ASA in a line with the table 700, and the column structure C and the rotation axis 612 may be located at the process positions that may be determined by the unit steps of the boring process prior to the attachment change signal. Thus, when the attachment change signal may be generated from the numerical controller 800, the boring process may be temporarily stopped and the column structure C and the rotation axis 612 may be located at the very process positions. Particularly, when the boring process may be just initiated, the process position may be substantially identical to the working origin point.

The change position and the process positions of the column structure C and the rotation axis 612 may be transferred to both of the numerical controller 800 and the central process unit 310. The attachment changer 300 may be operated under the control of the numerical controller 800.

Referring to FIGS. 10B and 11, the pallet P and the table 700 may move to the pallet standby area PSA and the configurations of the current spindle assembly 600 may be analyzed by the spindle analyzer 320, to thereby generate the spindle analysis data (step S200).

The spindle analyzer 320 may be operated by the central process unit 310 and the current spindle state may be generated as the spindle analysis data. Thus, the current spindle state and the change position may be obtained by the spindle analyzer 320 and the position detector 341 in response to the attachment change signal.

The spindle analyzer 320 may check the current tool/ attachment configurations. Then, the current state of the spindle assembly 600 may be generated as the spindle analysis data. For example, the spindle analysis data may include an empty state indicating that no attachment or no tools may be combined to the spindle assembly 600, a dummy state indicating that a dummy attachment may be combined to the spindle assembly 600, an attach state indicating that a working attachment may be combined to the spindle assembly 600 and a tool state indicating that a working tool may be combined to the spindle assembly 600. The spindle analysis data may be transferred to both of the stacker driver 342 and the numerical controller 800.

Referring to FIGS. 10C and 11, when the change position and the current spindle state may be obtained, the stacker driver 342 drive the stacker 100 to move to the working area WA in such a way that the adapter 613 may be aligned with the select attachment in the stacker 100 at the change position.

When the current state of the spindle assembly 600 may be detected as the empty state, the select attachment may be instantly combined to the adapter 613 from the stacker 100 (step S300). In contrast, when the current state of the spindle assembly 600 may be detected as one of the dummy state, the attach state and the tool state, the dummy attachment, the working attachment or the tool may be firstly separated from the spindle assembly 600 (step S400). Thereafter, the current state of the spindle assembly 600 may be changed into the empty state, and then the select attachment may be combined into the empty adapter 612 of the spindle assembly 600.

Figure 12:
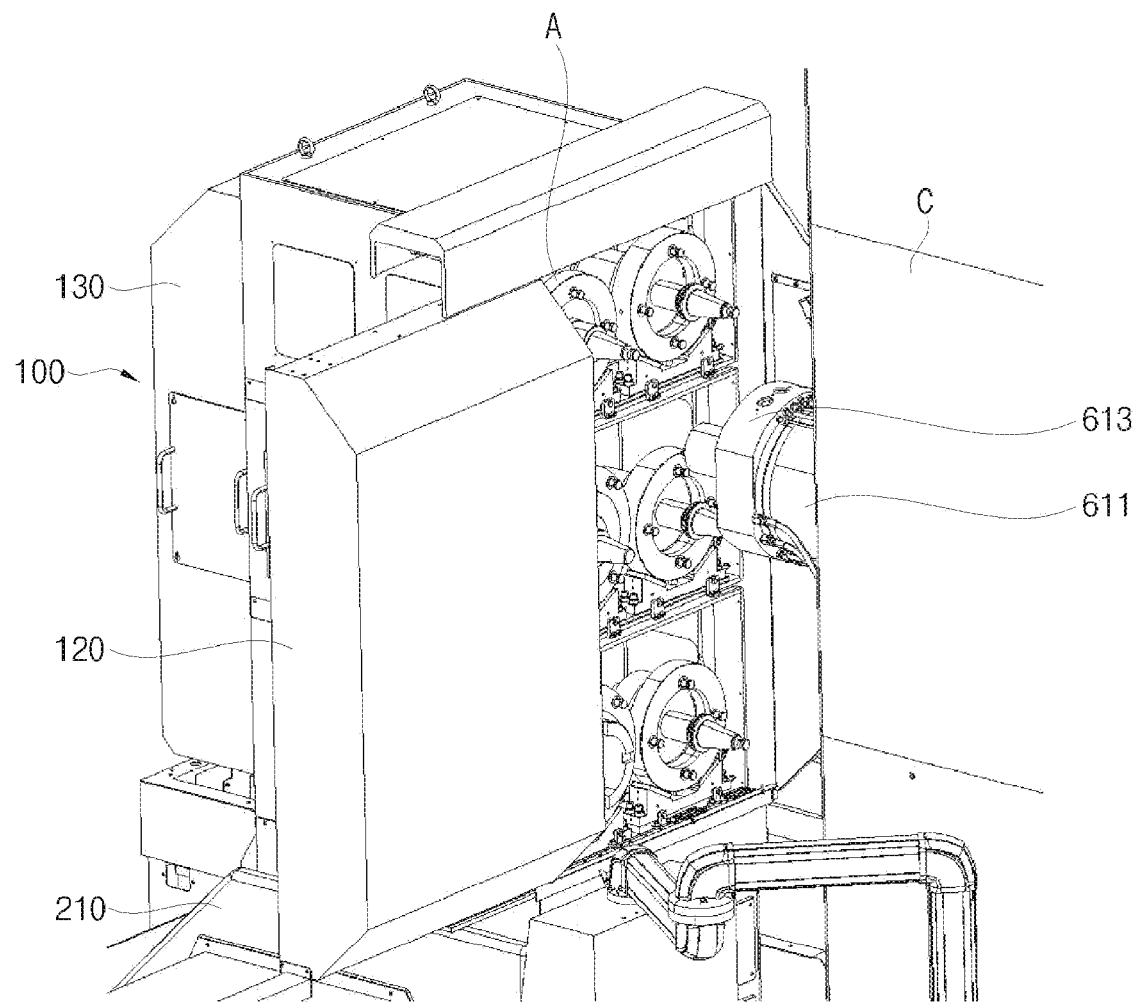
FIG. 12 is a perspective view illustrating an alignment between the adapter shown in FIG. 10C and the stacker.

FIG. 12 is a perspective view illustrating an alignment between the adapter shown in FIG. 10C and the stacker.

Referring to FIG. 12, when the stacker 100 may move to the working area WA from the attachment standby area ASA and be positioned at the change position, the select attachment in the stacker 100 may be aligned with the adapter 613. That is, the select attachment may face the adapter 613 at the change position.

When the stacker 100 may move toward the change position, the rotation axis 612 may move backwards to the design origin point and thus the interference between the rotation axis 612 and the stacker 100 may be sufficiently prevented. In addition, the column structure C may also move to the change position together with the retreat of the rotation axis 612. In such a case, the position error between the point at which the rotation axis 612 may be retreated and the first shaft position detected by the first detection dog 651 may determine the accuracy of the retreat of the rotation axis 612 in the automatic attachment change.

When the select attachment may need a coupling head, the spindle analyzer 320 may further detect whether or not the coupling head may be provided with the spindle structure 610. Thus, when no coupling head may be combined to the spindle structure 610, the coupling head may be firstly combined to the adapter 613 prior to the attachment change.

When the current state of the spindle assembly 600 may be detected as one of the dummy state and the attach state, the dummy attachment or the working attachment may be firstly separated from the spindle assembly 600. At first, the spindle analyzer 320 may analyze the working attachment or the dummy attachment, and then the specifications of the working attachment or the dummy attachment may be generated as working/dummy attachment data. Thereafter, the stacker 100 having an empty housing cell HC may move to a return position that may be obtained by using the working/dummy attachment analysis data and the current state of the spindle assembly 600. The empty housing cell HC may be aligned with the working attachment or the dummy attachment at the return position.

Then, the working attachment or the dummy attachment may be separated from the adapter 612 and may be received in the empty housing cell HC of the stacker 100. Thereafter, the column structure C may move backwards in the first direction I until the spindle assembly 600 may be sufficiently spaced apart from the stacker 100. Thus, the rotation axis 612 of the spindle assembly 600 may move backwards to the design origin point. Thereafter, the column structure C and the stacker 100 may move to the change position in such a way that the empty adapter 613 may be aligned with the select attachment in the stacker 100. Then, the select attachment may be combined to the empty adapter 613 from the housing cell HC of the stacker 100.

In addition, when the current state of the spindle assembly 600 may be detected as the tool state, the boring tool may be firstly separated from the spindle assembly 600 by a tool change process. For example, an additional automatic tool changer may be provided with the boring machine 1000 for the boring tool change. When no dummy attachment or no working attachment may be combined to the adapter 612 after the tool separation, the select attachment may be instantly combined to the adapter 612 as described in detail in step S300. In contrast, when the dummy attachment or the working attachment may be combined to the adapter 612 after the tool separation, the dummy attachment or the working attachment may be firstly separated from the adapter 612 and then the select attachment may be combined to the adapter 612 as described in detail in step S400. In the preset example embodiment, the tool separation, the separation of the dummy attachment or the working attachment and the coupling of the select attachment may be conducted automatically in the boring machine 1000.

When the spindle structure 610 and the stacker 100 may be positioned at the change position in such a way that the adapter 612 and the housing cell HC holding the select attachment may be aligned with each other, the door 120 of the stacker 100 may be opened and a hydraulic clamp device (not shown) of the adapter 612 may be operated in such a way that the coupling stud (not shown) of the select attachment may be inserted into a coupling hole (not shown) of the adapter 612. When the coupling stud may be sufficiently inserted into the coupling hole, the change controller 343 may generate a clamp signal as the change completing signal and may transfer the clamp signal to the central process unit 310. In the present example embodiment, while the clamp signal may be function as the change completing signal, any other signals for completing the attachment change between the adapter 612 and the select attachment in the housing cell HC would be used as the change completing signal as long as the signal may indicate the combination of the adapter 612 and the select attachment.

Then, the current attachment data may be automatically replaced with the specifications of the select attachment by the central process unit 310 in response to the change completing signal. For example, an attachment length, a rotation speed, a transfer length, a stroke range, a gear ratio of the select attachment may be set as the current attachment data when the select attachment may be sufficiently combined to the adapter 612.

Further, the second shaft position may be newly detected by the second detection dog 653 after the select attachment may be combined to the adapter 612. Since the boring process may be conducted by using the select attachment, the newly second shaft position corresponding to the select attachment may be automatically set as a new working origin point.

Referring to FIGS. 10D and 11, when the select attachment may be sufficiently combined to the adapter 613 and the change completing signal may be transferred to the central process unit 310, the AAC mode may be completed and the boring machine 1000 may be operated in a working mode in response to the change completing signal (step S500). The stacker 100 may return to the attachment standby area ASA and the AAC mode may be changed into the working mode in which the boring process may be conducted to the workpiece under the control of the numerical controller 800.

For example, the numerical controller 800 may control the column structure C to move backwards in the first direction I until the spindle assembly 600 may be sufficiently spaced apart from the stacker 100 and the stacker driver 342 may control the stacker 100 to move backwards to the attachment standby area ASA.

Although not shown in figures, a working tool may be automatically combined to the select attachment by using the automatic tool changer (not shown) and then the pallet P to which the workpiece and the table 700 may also move again to the working area WA from the pallet standby area (PSA). Then, the boring process may be automatically conducted to the workpiece by using the select attachment as a new working attachment under the control of the numerical controller 800.

Accordingly, the working attachment may be automatically exchanged with the select attachment according to the process steps of the boring process, thereby improving the exchange efficiency of the attachment. Particularly, the stacker 100 may be positioned in a line with the table 700 and the stacker itself 100 may move to the change position in such a way that the select attachment in the stacker 100 may be aligned with the spindle structure 610. Thus, no additional attachment transfer may be required in the present example of the boring machine 1000. In addition, the retreat of the rotation axis 612 to the design origin point, the modification of the current attachment data based on the attachment data of the select attachment and the modification of the working origin point in the working area based on the attachment data of the select attachment may be automatically conducted in the attachment change process, thereby increasing the change accuracy of the attachment.

INDUSTRIAL APPLICATION

According to the example embodiments of the automatic attachment changer and the boring machine having the same, the change position at which the attachment change may occur may be automatically or semi-automatically determined and the stacker including the select attachment may move to the change position in response to the attachment change signal. Then, the select attachment may be automatically combined to the spindle assembly of the boring machine. The attachment data of the select attachment may be automatically called up from the data storage unit and the current attachment data may be automatically modified based on the attachment data of the select attachment. The change position may be automatically detected based on the modified current attachment data.

In the conventional boring machine, the select attachment is individually extracted from the attachment magazine and is individually transferred to the change position by the operation of a crane and the current attachment data and the change position may be manually modified based on the attachment data of the select attachment. However, according to the present invention of the automatic attachment changer, the detection of the change position, the transfer of the stacker and the attachment change at the spindle assembly may be automatically conducted in the boring machine, thereby preventing or minimizing tool damages and boring errors in the boring machine.

Further, when the tool change and the attachment change may be automatically conducted according to the process step of the boring process under the control of the numerical controller, the transfer of the stacker and the retreat of the rotation axis to the design origin point and the coupling of the select attachment to the spindle structure and the modification of the current attachment data based on the attachment data of the select attachment may be automatically conducted in the attachment change process, thereby increasing the accuracy and efficiency of the attachment change. In addition, the retreat of the rotation axis 612 to the design origin point, the modification of the current attachment data based on the attachment data of the select attachment and the modification of the working origin point in the working area based on the attachment data of the select attachment may be automatically conducted in the attachment change process, thereby increasing the change accuracy of the attachment.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. An automatic attachment changer comprising:
a stacker having a plurality of housing cells that are stacked one on top of another with respect to a vertical direction, the stacker receiving therein a plurality of attachments such that at least one of the plurality of attachments is received in each of the plurality of housing cells, wherein each of the plurality of housing cells has a length larger than the at least one of the plurality of attachments received therein, and each of the plurality of attachments is arranged in the stacker so as to be oriented horizontally;
a stacker carrier comprising a carrier body secured to the stacker, a body transfer that moves the carrier body and the stacker, and a carrier power that drives the body transfer for moving the carrier body and the stacker; and
an attachment changer for controlling the stacker and the stacker carrier such that a select attachment selected among the plurality of attachments is combined to a spindle assembly of a boring machine,
wherein each of the plurality of attachments is supported in a corresponding one of the plurality of housing cells by a respective support having a support v-block and a position guide, the support v-block and the position guide of each support being coupled to one another at one of a plurality of coupling positions at a given time by a coupler, the plurality of coupling positions being separated from one another in a horizontal direction, wherein the position guide of each support has a respective plurality of signal generators that are separated from one another so as to each correspond to a given coupling position of the plurality of coupling positions, and each of the plurality of generators of each support is able to generate a position signal when the corresponding support v-block is coupled to the position guide at that corresponding coupling position.

2. The automatic attachment changer of claim 1, wherein each support is arranged in a longitudinal direction in the corresponding one of the plurality of housing cells, and each support supports the corresponding one of the plurality of attachments in the longitudinal direction.

3. The automatic attachment changer of claim 2, wherein each support further has:
a respective detection v-block disposed at an inlet of the corresponding one of the plurality of housing cells,
the detection v-block including a head position pin that supports a head portion of the corresponding one of the plurality of attachments and detects a position of the head portion, and further including a housing signal generator that generates a housing signal when the corresponding one of the plurality of attachments is received.

4. The automatic attachment changer of claim 3, wherein the position guide of each support is combined to a bottom of the corresponding one of the plurality of housing cells and is coupled with the associated support v-block at the one of the plurality of coupling positions to thereby change a support point at which a tail portion of the corresponding one of the plurality of attachments is supported regardless of a length of the corresponding one of the plurality of attachments.

5. The automatic attachment changer of claim 4, wherein the position signal indicates a position of the support point and the position signal is transmitted to the attachment changer.

6. The automatic attachment changer of claim 1, wherein
the body transfer is connected to the carrier body and includes a ball screw for linearly moving the carrier body and the stacker, and
the carrier power includes a servo motor that is controlled by the attachment changer and changes a rotation direction of the ball screw.

7. The automatic attachment changer of claim 1, wherein the attachment changer includes:
a spindle analyzer for analyzing the spindle assembly of the boring machine and for generating spindle analysis data;
a data storage unit for storing attachment data of each of the plurality of attachments received in the stacker; and
an attachment change unit controlling the select attachment selected among the plurality of attachments received in the stacker to align with the spindle assembly and to combine the select attachment with the spindle assembly.

8. The automatic attachment changer of claim 7, wherein the attachment change unit includes:
a position detector for detecting a change position at which the select attachment is changed based on the attachment data and the spindle analysis data;
a stacker driver for driving the stacker to move to the change position such that the select attachment is aligned with the spindle assembly; and
a change controller for controlling the position detector and the stacker driver by control signals.

9. A boring machine comprising:
a spindle assembly secured to a column structure that moves in a first direction and that extends in a second direction substantially perpendicular to the first direction the spindle assembly being selectively combined with at least one of a tool and a select attachment;
a table to which a workpiece is secured, the table being movable in a third direction that is substantially perpendicular to the first direction and the second direction; and
the automatic attachment changer according to claim 1.

10. The boring machine of claim 9,
wherein the plurality of housing cells of the stacker are stacked one on top of another in the second direction and each of the plurality of housing cells has the length larger than the at least one of the plurality of attachments received therein in the first direction;
wherein each support further has a respective detection v-block disposed at an inlet of the corresponding one of the plurality of housing cells, each detection v-block including a head position pin that supports a head portion of the corresponding one of the plurality of attachments and detects a position of the head portion, and further including a housing signal generator that generates a housing signal when the corresponding one of the plurality of attachments is received.

11. The boring machine of claim 10, wherein the position guide of each support is combined to a bottom of the corresponding one of the plurality of housing cells and is coupled with the associated support v-block at the one of the plurality of coupling positions to thereby change a support point at which a tail portion of the corresponding one of the plurality of attachments is supported regardless of a length of the corresponding one of the plurality of attachments.

12. The boring machine of claim 9, wherein the attachment changer includes:
a spindle analyzer for analyzing the spindle assembly of the boring machine and for generating spindle analysis data;
a data storage unit for storing attachment data of each of the plurality of attachments received in the stacker; and
an attachment change unit for controlling the select attachment selected among the plurality of attachments received in the stacker to align with the spindle assembly and to combine the select attachment with the spindle assembly.

13. The boring machine of claim 12, wherein the attachment change unit includes:
a position detector for detecting a change position at which the select attachment is changed based on the attachment data and the spindle analysis data;
a stacker driver for driving the stacker to move to the change position such that the select attachment is aligned with the spindle assembly; and
a change controller for controlling the position detector and the stacker driver by control signals.

14. The boring machine of claim 13, wherein the spindle assembly includes:
a spindle structure that is connected to the column structure and that includes a rotation shaft that is linearly movable in the first direction with respect to the column structure and an adapter to which the select attachment is combined; and a pair of detection dogs for detecting respective shaft positions of a power shaft through which a driving power is transferred to the spindle assembly in the first direction.

15. The boring machine of claim 14, further comprising a numerical controller for controlling a boring process to the workpiece with numerical control algorithms and for generating an attachment change signal.

16. The boring machine of claim 15, wherein the numerical controller includes:

an axis driver for linearly moving the rotation shaft with respect to the column structure in the first direction;

a column driver for moving the column structure in the first direction; and a spindle driver for moving the spindle structure in the second direction.

17. The boring machine of claim 16, wherein the pair of detection dogs include a first detection dog for detecting a first position of the rotation shaft before the select attachment is combined to the adapter and a second detection dog for detecting a second position of the rotation shaft after the select attachment is combined to the adapter.

* * * * *